United States Patent

Zachar et al.

[15] 3,686,637

[45] Aug. 22, 1972

[54] RETAIL TERMINAL

[72] Inventors: James E. Zachar, Dayton; Walter E. Srode, Jr., Xenia, both of Ohio

[73] Assignee: The National Cash Register Company, Dayton, Ohio

[22] Filed: Sept. 14, 1970

[21] Appl. No.: 71,971

[52] U.S. Cl. ..........340/172.5

[51] Int. Cl. ..........G06f 3/04, G06f 15/22

[58] Field of Search ..........340/172.5

[56] References Cited

UNITED STATES PATENTS

| | | | |
|---|---|---|---|
| 3,335,407 | 8/1967 | Lange et al. | 340/172.5 |
| 3,315,235 | 4/1967 | Carnevale et al. | 340/172.5 |
| 3,267,436 | 8/1966 | Alpert et al. | 340/172.5 |
| 3,308,439 | 3/1967 | Tink et al. | 340/172.5 |
| 3,407,387 | 10/1968 | Looschen et al. | 340/172.5 X |
| 3,516,068 | 6/1970 | Howard et al. | 340/172.5 |
| 3,380,025 | 4/1968 | Ragland | 340/172.5 |
| 3,478,322 | 11/1969 | Evans | 340/172.5 |

*Primary Examiner*—Gareth D. Shaw
*Assistant Examiner*—Sydney R. Chirlin
*Attorney*—Louis A. Kline, John J. Callahan and Harry W. Barron

[57] ABSTRACT

A point of entry terminal suitable for use in a retail business is described which includes a terminal control unit having a plurality of peripheral units coupled thereto. Each of the peripheral units performs certain functions necessary in the processing of a sale, return, or exchange of merchandise transaction. The control unit controls each of the peripheral units in accordance with a series of program instructions associated therewith. In addition to the normal transactions, there are several special types of transactions. The operator of the terminal is guided through each portion of each transaction by special messages informing him of what entries are to be made for that portion. The terminal is connected in a real-time, on-line manner to a data collector for recording data concerning the transaction for processing for inventory control and the like.

52 Claims, 22 Drawing Figures

Patented Aug. 22, 1972 3,686,637

14 Sheets-Sheet 1

INVENTORS
JAMES E. ZACHAR &
WALTER E. SRODE, JR.
BY Louis A Kline
John J. Callahan
Harry W Barron
THEIR ATTORNEYS INVENTORS
JAMES E. ZACHAR &
WALTER E. SRODE, JR.
BY Louis A. Kline
John J. Callahan
[illegible signature]
THEIR ATTORNEYS

INVENTORS
JAMES E. ZACHAR &
WALTER E. SRODE, JR.

BY Louis A Kline
John J. Callahan
Harry W. Barron
THEIR ATTORNEYS

INVENTORS
JAMES E. ZACHAR &
WALTER E. SRODE, JR.

BY

THEIR ATTORNEYS

INVENTORS
JAMES E. ZACHAR &
WALTER E. SRODE, JR.

BY Louis A. Kline
John J. Callahan
Harry W. Barron
THEIR ATTORNEYS

INVENTORS
JAMES E. ZACHAR &
WALTER E. SRODE, JR.

BY Louis A Kline
John J. Callahan
Harold A Pierson
THEIR ATTORNEYS

INVENTORS
JAMES E. ZACHAR &
WALTER E. SRODE, JR.

BY Louis A. Kline
John J. Callahan
James C. Brown

THEIR ATTORNEYS

INVENTORS
JAMES E. ZACHAR &
WALTER E. SRODE, JR.
BY Louis A. Kline
John J. Callahan
Harry W. Barron
THEIR ATTORNEYS

INVENTORS
JAMES E. ZACHAR &
WALTER E. SRODE, JR.

BY

THEIR ATTORNEYS

INVENTORS
JAMES E. ZACHAR &
WALTER E. SRODE, JR.
BY Louis G. Kline
John J. Callahan
Harry W. Barron
THEIR ATTORNEYS

INVENTORS
JAMES E. ZACHAR &
WALTER E. SRODE, JR.

BY [signatures]

THEIR ATTORNEYS

INVENTORS
JAMES E. ZACHAR &
WALTER E. SRODE, JR.

BY Louis A. Kline
John J. Callahan
Harry W. Barron
THEIR ATTORNEYS

INVENTORS
JAMES E. ZACHAR &
WALTER E. SRODE, JR.
BY Louis A Kline
John J. Callahan
Harry W Barron
THEIR ATTORNEYS

INVENTORS
JAMES E. ZACHAR &
WALTER E. SRODE, JR.

BY Louis A Kline
John J. Callahan
Harry W Barron
THEIR ATTORNEYS

RETAIL TERMINAL

This invention relates to a point of entry terminal for use in processing a commercial transaction and more particularly to a retail terminal which may be used to process a retail sale in a retail store.

Modern merchandising techniques require a detailed knowledge of the articles being sold to the general public in order that proper inventory controls may be maintained on the stock of a retail establishment. This requirement is particularly vital in a large multi-product store such as a department store, where thousands and thousands of different items are sold every day and where it is necessary to continually re-order items before the entire stock is diminished. One way to insure an adequate inventory is to order large amounts of goods and therefore not have to re-order them so often. However, it is extremely expensive to maintain such large inventories not only because money is tied up by goods sitting on the shelf waiting to be sold but also because space must be utilized to store these items. With the advent of modern computer technology, it has become possible to assign a specific number to each item of inventory in a retail outlet. As an item is sold, this number can be recorded on a computer which, when properly programmed, keeps track of the inventory automatically. Further, the computer can be used to re-order the merchandise automatically whenever the quantity of merchandise drops below a certain level.

In the past, this inventory control has been accomplished by entering the numbers associated with each article of merchandise into a cash register and, after closing hours, by taking the tape of the cash register to the computer and manually inserting each tape of information therein. Another manner by which this may be done is to have specially coded tags on each article of merchandise and then have tag readers read the tags. However, in each of these operations special effort is required to take either the cash register tape or the tags from each register station to a central location to be processed after the closing hours.

A major problem in the retailing industry is that there is needed a real-time, on-line point of entry terminal which can accept all of the coded information associated with the particular articles being sold as well as the price and the quantity thereof, and process this information and send it to a central facility where inventory control can be maintained.

A point of sale terminal of this sort must have stand-alone capability; that is, all transactions must be capable of being handled by the terminal even though communications with the central facility have been lost. As long as electric power is present, the terminal must operate to keep the establishment in business. In addition to stand-alone capability, the terminal should provide data error check, should perform all arithmetic functions (extension, change computation, sales tax calculation, discount calculations, etc.), and should provide for operator lead-through for all types of transactions (merchandise entries, opening, closing, re-entries, etc.). In addition to these functions, the terminal should have means for automatically entering data of all sorts (merchandise data, account numbers, clerk numbers, etc.), should provide for credit authorization, and should be flexible enough to allow future growth or procedural changes.

The major problem in providing a retail terminal which can accomplish these functions is the cost. State-of-the-art digital computers which could do this are prohibitively expensive if it is required that a digital computer be associated with each cash register, even if the computers were the so-called minicomputers. However, digital computer technology can be applied to a point of entry terminal to allow a reasonably-priced terminal to be provided which can economically perform the real-time, on-line functions set out above.

In accordance with this invention, there is provided a terminal for processing transaction information relating to a commercial transaction comprising memory means for providing a sequence of instruction signals and a sequence of transaction control signals. There is further provided logic means responsive to the instruction signals and the transaction control signals providing a plurality of first type signals in a predetermined order. Each of the first type signals provided is unique to one type of the transaction information required. Additionally, there is provided data input means for providing data signals relating to the transaction information. The date signals are provided in an order determined by the first type signals provided. The logic means is responsive to the data signals, the instruction signals, and the transaction control signals to process the data signals and to provide a terminal output signal representing the commercial transaction.

A more detailed description of the invention is hereinafter given with specific reference being made to the following FIGURES, in which.

Figure 1:
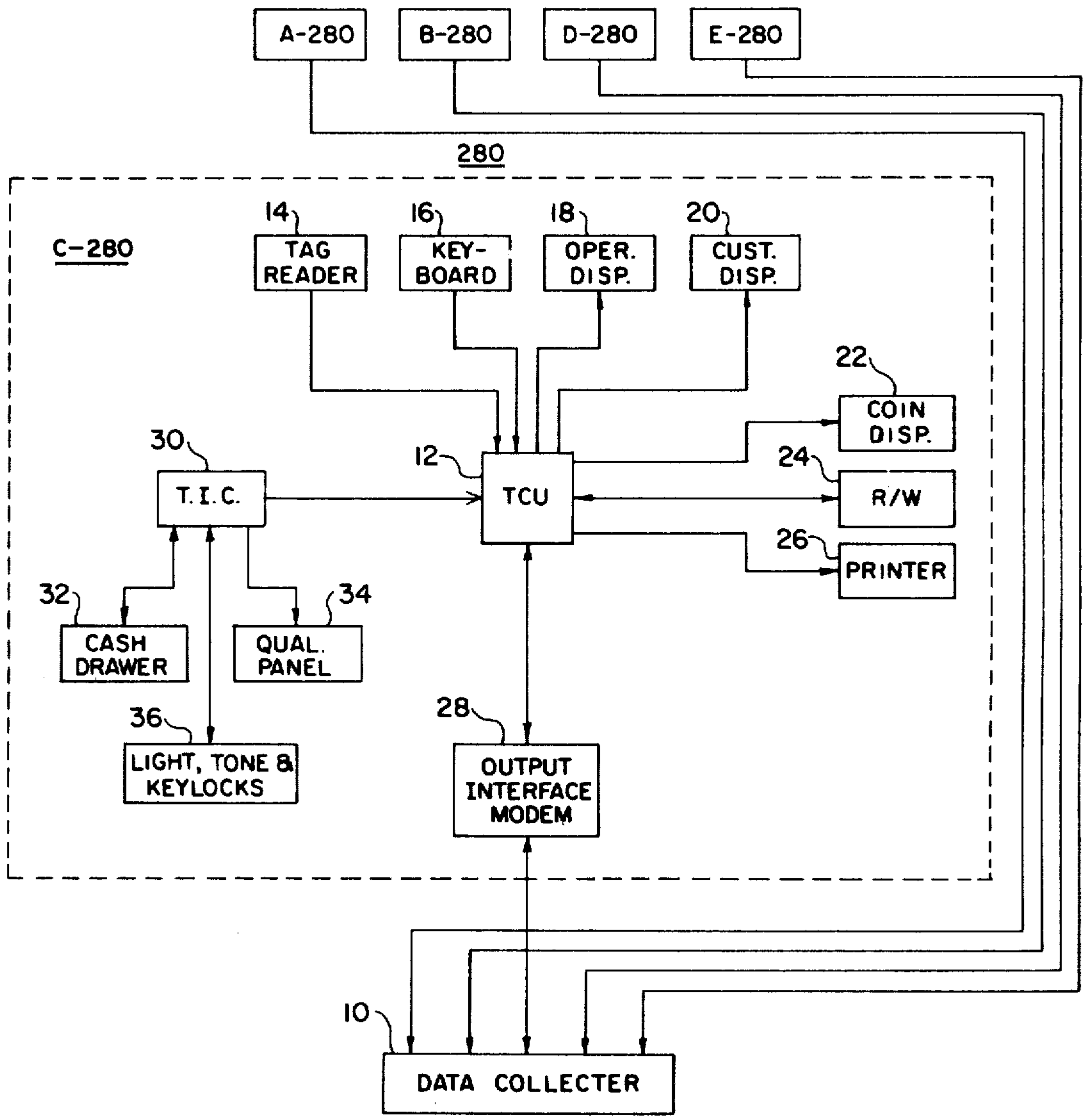
FIG. 1 is a block diagram of a terminal system as used, for instance, in a retail department store.
Figure 13A:
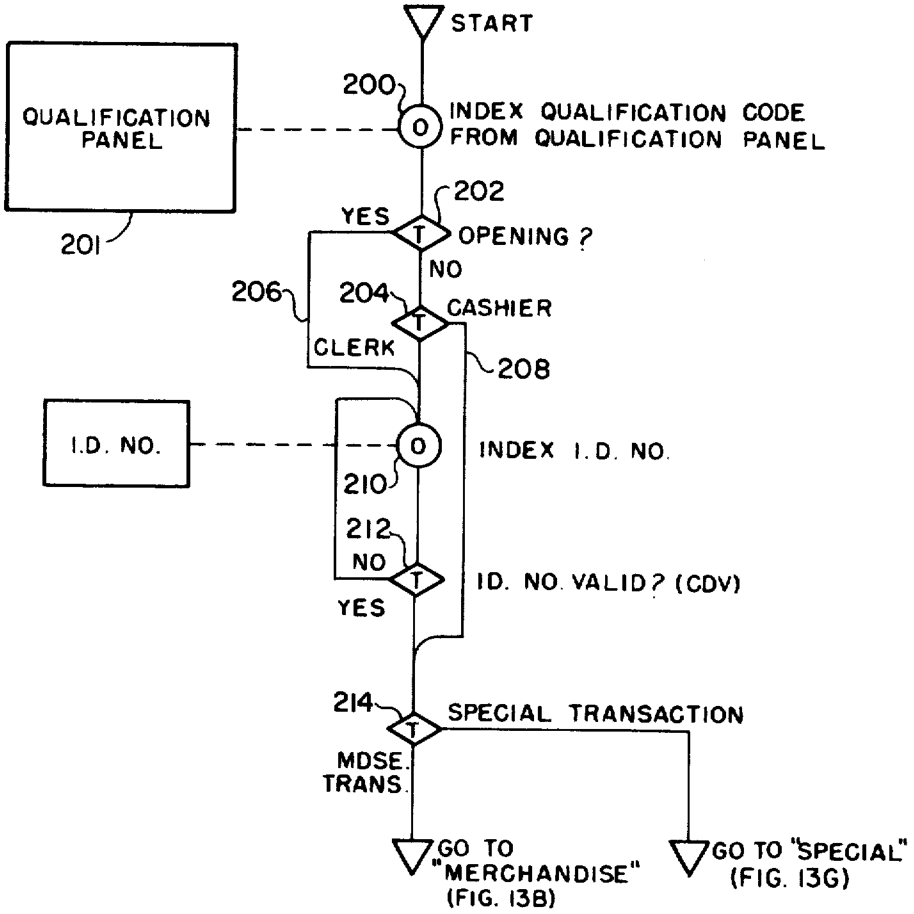
Figure 14:
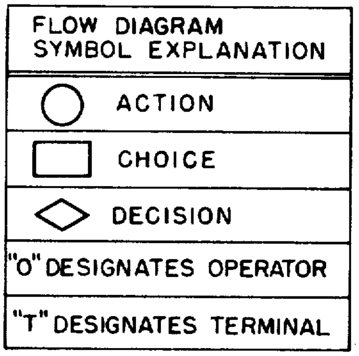

FIGS. 8 to 12 inclusive show the five various formats of the instructions provided by the read-only memory of the terminal control unit;

FIGS. 13A through 13I show a transaction flow diagram for processing the various types of transactions which can be processed by the terminal shown in FIG. 1; and FIG. 14 is a chart showing the meaning of the symbols used in FIGS. 13A through 13I.

Referring now to FIG. 1, there is shown a retail transaction control system 280, which includes a plurality of retail terminals, five of which, A–280, B–280, C–280, D–280, and E–280, are shown, and a data collector 10. Each of the terminals A–280, B–280, C–280, D–280, and E–280 is coupled to the data collector 10 and provides the data collector 10 with information concerning retail transactions. This coupling may be made in any of several ways, one of which is through telephone lines. With this type of connection, it is possible that certain of the terminals can be in one store and certain other terminals may be in branch stores on the other side of town from the main store.

The data collector 10 includes means for scanning in a periodic manner each of the terminals A–280, B–280, C–280, D–280, and E–280, to see whether they have any information to be applied thereto. In the event the terminal being scanned has information to be applied, the data collector 10 sends out the appropriate control signals to cause the information to be provided thereto. In the event the terminal being scanned has no information to be sent at that time, the data collector 10 scanning means moves on to the next sequential terminal to see whether it has information to be transmitted. In this manner, each of the terminals can be connected to the data collector in essentially a real-time, on-line manner. The data collector 10 may be merely a digital tape recorder which records the data for later processing by a larger central computer, or it may be the larger central computer itself, so that, at any given time, inventory control information can be obtained by persons needing to know this information.

Reference is now specifically made to the retail terminal C–280, which is shown in block diagram form. The other terminals, A–280, B–280, D–280, and E–280, are identical to the terminal C–280, and these other terminals are not shown or hereinafter discussed in any detail. The heart of the terminal C–280 is a terminal control unit (TCU) 12. The TCU 12 is actually a relatively small and slow central processor unit which has a plurality of ports to which other modules or peripheral units of the retail system can be coupled. The TCU 12 has a fixed program in a read-only memory thereof, and this program contains instruction commands that are carried out by the TCU 12 logic. These instructions can (1) control the sales transaction sequence, (2) check for input date errors, (3) perform the mathematical operations necessary, (4) buffer the processed data, and (5) transfer the data to the data collector 10. Any change in the sequence of the instructions necessarily requires a change in the read-only memory. A more detailed description of the TCU 12 is given hereinafter, and a still more detailed description may be obtained by reference to U.S. Pat. application, Ser. No. 72,084, which is being filed the same day as this application in the names of Ralph D. Haney, James E. Zachar, and Charles J. Drozd and which is entitled "Digital Processor."

In the C–280 retail terminal, the modules which are connected to the ports of the TCU 12 include a tag reader 14, a keyboard 16, an operator display 18, a customer display 20, a coin dispenser 22, a read/write (R/W) memory 24, a printer 26, an output interface and modem 28, a terminal indicator control (TIC) 30, which in turn controls a cash drawer 32, a qualification panel 34, and certain lights, tones, and keylocks 36. Each of the modules connected to the TCU 12 ports continually provides status information to inform the TCU 12 of their current status (for example, ready, busy, idle, etc.). The TCU 12 can provide function information to each of the modules to require them to perform certain functions (for example, print, display a number, open the cash drawer, etc.). The tag reader 14, the keyboard 16, the read/write memory 24, and the TIC 30 can provide data to the TCU 12 as indicated by arrowheads pointing from these units to the TCU 12. On the other hand, the operator display 18, the customer display 20, the coin dispenser 22, the read/write memory 24, the printer 26, and the output interface and modem 28 will receive data from the TCU and process it in a predetermined manner, as indicated by arrowheads pointing towards these modules.

A general description of each of the modules connected to the TCU 12 will now be given. There will be no specific description of the detailed logic associated with these modules, as it is felt that, with the given description of the functional operation of each module, appropriate logic can be easily designed by those skilled in the art to accomplish the necessary functions stated.

Before the detailed description of each of the modules is given, however, a general description of the interaction of the TCU 12 and a module must be understood. One type of instruction to which the TCU 12 is responsive will cause a coded function signal to be sent to a particular port. This instruction, which will be explained in detail hereinafter, includes coded binary information of three different types, which are (1) a four bit operation code, (2) a four bit port code, and (3) a four bit function code. Logic circuitry associated with the TCU 12 will first decode the four bit operation code, and, if this operation code specifies that the instruction calls for sending a function signal to a module, the logic circuitry will then look at the port code and select the one of the 16 possible ports which is determined by this four bit port code. Thereafter, the code for the particular function to be performed will be sent to the module connected to the chosen port. In this manner, the TCU 12 can control any one of the ports to perform any of the desired functions which that port is capable of performing in response to an instruction stored in the TCU 12 read-only memory.

Further, since each of the modules is constantly sending status information to the TCU 12, another instruction associated with the TCU 12 can cause the program to branch in response to a particular status being transmitted. In other words, means associated with the TCU 12 can compare the status transmitted to a given port from a given module with a certain status which is stated as part of this instruction. If the status of the module and the instruction status compare in one manner, the program can be altered to go to a different location, or, if they compare in another manner, the program will continue.

Referring now to the individual modules and specifically to the tag reader 14, a complete description thereof is given in U.S. Pat. application, Ser. No. 837,850, filed June 30, 1969, in the name of John B. Christie and entitled "Transition Code Recognition System," and in another U.S. Pat. application, Ser. No. 837,514, filed June 30, 1969, in the names of John B. Christie, Dzintars Abuls, and Wilfridus G. van Breukelen and entitled "Transition Code Recognition System." Generally, the tag reader 14 includes an element which may be in the form of a pencil and which is scanned across a sequence of colored bars which may be the colors green, black, and white. The sequence of colors bars will convey a certain binary code which may be determined by scanning the pencil thereacross. The tag reader 14 may also be any other well-known type of tag reader, such as one which reads perforations in a tag to obtain digital information therefrom. The term "tag" as used herein is defined to mean any medium capable of conveying coded information, and the tag reader 14 may be any means for reading that coded information.

The four bit port code associated with the tag reader 14 is "1011," and, whenever this number appears as that part of an instruction in the TCU 12 which refers to a port, the tag reader 14 port will be selected. The tag reader 14 only transfers data to the TCU 12 in response to a NDAT, or input data, function signal sent thereto by the send function type of instruction of the TCU 12. The data is sent one character at a time from a storage buffer circuit within the tag reader 14 which stores all of the information read when the pencil is scanned across the coded tag. A character of data in the system 280 is eight bits of binary data. Each time the NDAT (input data) function is sent to the tag reader 14, another character of data is sent to the TCU 12.

Another function signal which TCU 12 can send to the tag reader 14 is the NINT, or initialized, function, which will reset the tag reader 14 to its initial state. In other words, the NINT function will cause the tag reader 14 to become capable of reading another tag. Another function signal which can be sent from TCU 12 to the tag reader 14 is NRTR, or retransmit, function which is sent upon receipt of a last character status (to be explained hereinafter) if a repeat transmission of the data stored in the tag reader 14 is required. sequence The tag reader 14 will continually be sending one of six different types of coded status information to TCU 12. The most common status which the tag reader 14 transmits will be the NIDL, or idle, status, which indicates that the tag reader 14 is not ready to transfer data to TCU 12 because, for instance, data has not been read from a coded tag or because it has not been completely checked yet. Another status which the tag reader 14 will send is NBSY, or a busy, status, which indicates that the tag reader 14 is loading a character for data transfer in the future. A third status is the NIPT, or input request, status, which indicates that the tag reader is ready to transfer the next character to the TCU 12. A fourth status is the NLST, or last character, status, which indicates that the tag reader 14 has transferred the last data character which it has stored to TCU 12. This last character is always the least significant character which has been read from the tag. There are also two error status signals which the tag reader 14 can transmit to TCU 12. The first error status signal is NER1 status, which indicates that a reading error has occurred in the data stored in the tag reader 14 buffer circuit, and therefore it is not usable. The second error status is NER2 status, which indicates that the reading error has occurred in only the second portion of a two-portion tag which has been read. The NER2 status allows the first portion of correctly read data to be transferred to the TCU12 while requiring a reread of the second portion of the tag or a manual insertion of the data conveyed by this portion through the use of the keyboard 16.

TCU 12 can be programmed to first check the status of the tag reader 14, and, if the status of the tag reader 14 is, for instance, NIPT (input request), then the program of TCU 12 could cause a branch to a new location. Instruction commands issued at the new location of the program could cause the input data function to be sent to the tag reader 14, which would respond to this function signal by sending an eight bit character of data to TCU 12. TCU 12 thereafter would process this data in a manner to be explained hereinafter.

When TCU 12 sends the NDAT function signal to the tag reader 14, requesting that a character of data be transmitted, the data transmitted will consist of numeric data and single character word separators and will be transmitted to a seven bit ASCII coded sequence of bits in bits one through seven of the character, with bit eight being a "don't care" bit. The tag code is so organized that the information conveyed by the code is in a given sequence of multi-character information portions, with a word separator character included to separate each portion of the code. When TCU 12 is calling for data to be sent from the tag reader 14, it will eventually receive one of the word separator characters. At this time, TCU 12 stops calling for characters and responds to that data already sent in a predetermined programmed manner dependent on the particular type of the data and separator sent. TCU 12 will know the type of data which it has received, because it will know the organization of the code on the tag and what data was previously sent.

The different types of information which the tag reader 14 transmits to TCU 12 include coded merchandise information manifesting the department number, the class number, the merchandise number, and the price of a particular article of merchandise, a clerk's identification number, and a customer's charge account number. Each of the four different numbers in the merchandise data will be separated by one of the word separators on the tag. TCU 12 will receive entire character of one of these four types of information and then process that information.

Figure 3:
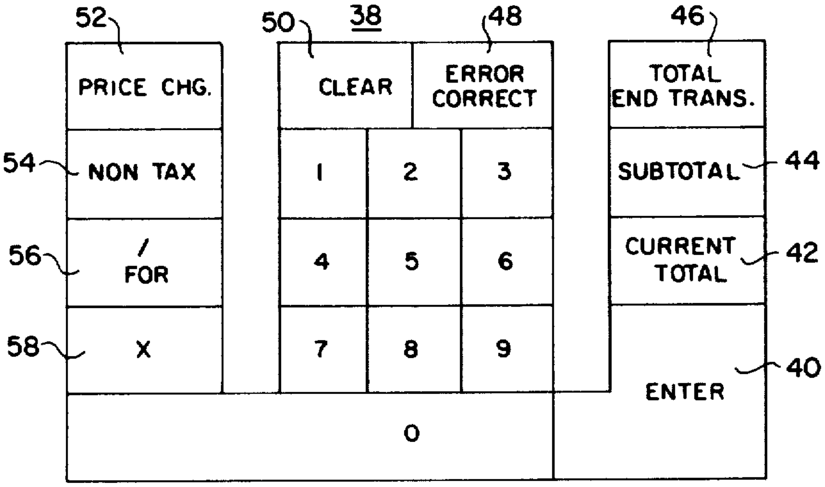
FIG. 3 is a diagram showing the keyboard layout with the various numeric and function keys provided in a terminal.

Another way of providing data to TCU 12 is through the use of the keyboard 16. Reference to FIG. 3 shows the 20 keys which are included in the keyboard 16. It is seen that there are 10 numeric keys — 0 through 9 — and 10 function keys which may be depressed. Each of these 20 keys will provide a different coded eight bit signal to TCU 12. TCU 12 in turn responds to the signals in a manner determined by the particular key depressed.

The keyboard 16 is coupled to the port which is responsive to the port coded signal "0001." The keyboard 16 will continually be sending one of three different types of coded status information to TCU 12 and will respond to one of two coded function signals applied thereto by TCU 12.

The first status code is a KIDL, or idle, status, which informs TCU 12 that data is not ready for input thereto; the second status is a KIN, or input request, status, which tells TCU 12 that data is ready for input thereto; and the third status is a KERR, or error, status, which tells TCU 12 that a keyboard error has been made.

The keyboard 16 will respond to the function codes KSND, or send data, and KCLR, or clear, which respectively cause the keyboard 16 either to send a signal eight bit character of data to TCU 12 or to reset the keyboard from the KERR, or error, status to the KIDL, or idle, status. Data can be entered into the keyboard 16 only when it is in the KIDL, or idle, status.

TCU 12 will store and display numeric data applied thereto from the keyboard 16 only until one of the function keys is depressed. The ENTER key 40 is the only key which can cause the data to be processed in accordance with the instruction commands provided to the TCU 12 logic. The CURRENT TOTAL key 42 is used to display the total amount of the transaction at the time the key is pressed. This may be used for instance, when a customer, in the middle of a transaction, desires to know how much he has spent.

The SUBTOTAL key 44 is used primarily as a sequence control key for the following applications. First, in a normal transaction, it is used to denote that the operator has finished entering the exchange or sale items. Second, in a cash count transaction (to be explained hereinafter), it is used to denote that the operator has finished entering information concerning the coins, paper currency, checks, etc., into the terminal. Third, it can also be used in a programming transaction (to be explained hereinafter) to cause the contents stored in the read/write memory 24 to be dumped. Finally, in a reentry transaction (to be explained hereinafter), the SUBTOTAL key 44 is used to denote the end of the reentries that are from a particular journal tape. The terminal will stay in a reentry mode but will require the reentry information to be taken from other journal tapes.

The TOTAL END TRANS. key 46 is used to denote that all non-merchandise entries (discount, fee, deposit, or allowance) have been made or that there are none of these to be made. If the TOTAL END TRANS. key is pressed at any other time in a merchandise transaction, it will cause termination of the transaction. The key may also be used to denote the end of the cash count or the reentry transactions.

The ERROR CORRECT key 48 is used to set up the condition to backout any merchandise item which has previously been entered in its entirety; that is, after the information relating to an item of merchandise and the ENTER key 40 have been depressed and the information has been entered into TCU 12. If at this time the customer decides that he no longer wishes to purchase that item, or the operator realizes that he has made a mistake, the ERROR CORRECT key 48 may be depressed, followed by a repeat of the information concerning the merchandise, and finally followed by the ENTER key 40. The terminal will then disregard the information concerning that item previously entered.

The CLEAR key 50 may be used to clear any data which has been indexed and displayed but not entered into the machine resulting from the depression of the ENTER key 40. For instance, this key would be used to correct an error condition in data.

The PRICE CHG. key 52 is used to qualify a merchandise item as having a price change associated therewith. It is used primarily when reading data through the use of the tag reader 14. When depressed, the PRICE CHG. key 52 causes TCU 12 to ignore that portion of the information applied thereto from the tag reader 14 concerning the price of the merchandise which the data manifests. It causes the operator to be instructed thereafter to enter the marked-down price through the keyboard 16, and in this manner all that the operator of the terminal need do is enter the price, inasmuch as the inventory control numbers had been entered through the use of the tag reader 14.

The NON TAX key 54 is used to qualify certain merchandise as non-taxable merchandise; that is, not subject to a sales tax. This key is depressed prior to the entry of the merchandise information, and it causes the price of the item to be added to a non-taxable itemizer as opposed to a taxable itemizer, where it would otherwise have been added. The merchandise item is assumed to be taxable unless the NON TAX key 54 is depressed. The NON TAX key 54 can also be used to qualify fees as non-taxable.

The /FOR key 54 is used as a separator between numeric fields such as a date entry (for example, 1/1/70), or it can be used to separate quantity and price when no extension is required, as where a customer buys three items for a dollar (for example, 3/1.00).

The X key 58 is used to separate two numeric fields, such as quantity and price, where several of the same item are purchased (for example, 3 × 1.00). TCU 12 responds to the X key 58 by multiplying the quantity times the price in an extension routine of the program. The X key can also be used during the cash count mode of operation.

Figure 4:
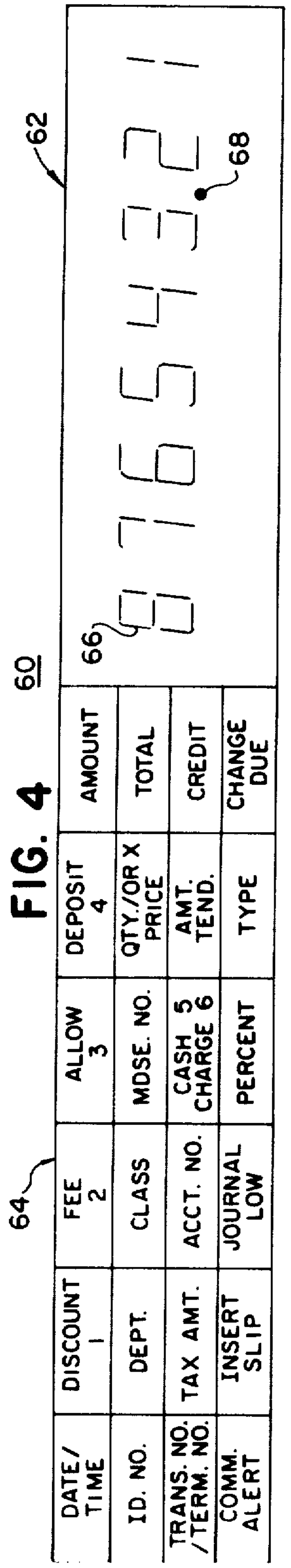
FIG. 4 is a diagram of the display device which the terminal operator sees.

Referring now to FIG. 4, a diagram showing how the operator display face plate 60 on the terminal appears to the operator is shown. From FIG. 4, it is seen that the operator display face plate 60 is divided into two portions, a numeric portion 62 and a message portion 64. The numeric portion 62 includes means for displaying any one of ten possible numeric digits — 0 through 9 — in eight positions. The numeric display portion 62 of the face plate 60 will display all numeric data entered into TCU 12 through the keyboard 16 or only the price information entered through the tag reader 14. The information in a normal merchandise transaction includes the inventory control information (department number, class number, and merchandise number), the price of the information, and any additional non-merchandise information which may be entered into the terminal C–280.

Figure 8:
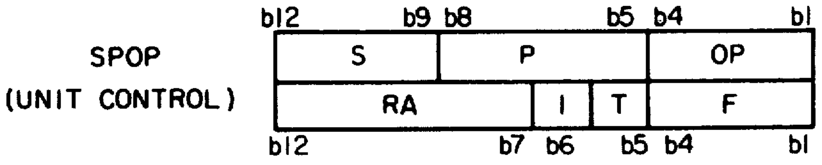

The numeric portion 62 of the display face plate 60 includes eight cells, each of which in turn includes seven segments, which are formed in a squared-off "-FIG. 8," such as the digit 66 in the leftmost position of the numeric portion 62 of the display face plate 60. By turning on any one or more of the segments of each digit, it is possible to be able to display any of the numbers between 0 and 9. There is further included a segment 68, positioned between the second and third digits from the right, which can be selectively turned on when it is necessary to punctuate data, as when the data represents a price.

Whenever a numerical digit is entered into the TCU 12 from the keyboard 16, it is displayed in the rightmost position of the display face plate 60 of the operator display 18. As subsequent numerical digits are entered into TCU 12, all of the previously displayed digits are left shifted one position, and the new digit is displayed in the rightmost position. This continues until all of the digits are entered.

Referring now to the message portion 64 of the display face plate 60, it is seen that it is possible to display any one of 24 different messages to the operator of the terminal C-280. The particular one of the 24 messages which may be displayed is controlled by signals applied to the display from the TCU 12. For instance, when it is necessary for the department number of a particular item of merchandise is to be entered, TCU 12 will send the proper signal to the logic circuitry (not shown) of the display 18, and the message in the second column, second row, of the message portion 64 of the display face plate 60, which is DEPT., will light up. This will indicate to the operator of the terminal that the next item of information to be entered is the department number, and the operator will then read this number from the price tag attached to the merchandise and enter it into the display, followed by the ENTER key 40.

After this is done, TCU 12 will process the department number numerical information in a manner to be described hereinafter and cause the window in the second row, third column, entitled CLASS, to light up, indicating that the next item of information to be entered is the class number of the item being sold. This process continues throughout the entire sequence of entries.

Certain of the other messages of the message portion 64 of the display face plate 60 do not indicate the information which is to be entered but, rather, indicate the information which is being displayed. For instance, if the message TOTAL in the sixth column, second row, is lighted, it indicates that the numbers being displayed on the numeric portion 62 of the face plate 60 are the total of the sale, which would include each of the merchandise items less any discount, plus any fees, plus taxes, and so forth. This window does not indicate that the total key 46 is to be depressed. The messages displayed by the message portion 64 of the display face plate 60 are not intended to instruct the operator which keys to push but, rather, are provided to guide the operator through the transaction to determine which information is required and is being displayed at a particular time. It is assumed that the operator has been trained to know which function keys are to be depressed for any given situation.

The operator display 18 will provide TCU 12 with signals indicating which of two possible status states it has assumed, and it will respond to one of five different types of function signals which are applied thereto from TCU 12. The status signal which the operator display 18 sends to TCU 12 will indicate that it is either in a DRDY, or ready, status or in a RBSY, or busy, status. If the status indicates that the operator display 18 is ready, TCU 12 will know that the operator display 18 is ready to receive and execute a function signal. On the other hand, if the status sent to TCU 12 indicates that the operator display 18 is busy, TCU 12 will know that no function code should be sent to the operator display 18.

The coded function signals which TCU 12 will send to the operator display 18 include a DCLU signal, instructing the operator display 18 to clear the entire display code, a DCLD signal, instructing the operator display 18 to clear only the numeric portion of the display, a DPUN signal, instructing the operator display 18 to punctuate certain displayed numeric data, a DSLD signal, instructing the operator display 18 to accept a numeric character signal, and a DSOD signal, instructing the operator display 18 to accept a data descriptor character signal. When the DCLU, or clear entire display function, signal is sent to the operator display 18, the numeric display portion 62 and the message display portion 64 are both cleared, so that no information is displayed by the operator display 18. When the DCLD, or clear numeric portion only, function signal is sent to the operator display 18, only the numeric display portion 62 will be cleared. This function signal will not affect the message display portion 64. When the clear entire display or other numeric portion only functions are being performed by the operator display 18, the status will be DBSY, or busy. After the function is performed, the status will return to DRDY, or ready.

When the DPUN, or punctuate, function signal is sent from TCU 12 to the operator display 18, the punctuate segment 68 will come on and will remain on until a DCLU, or clear entire display, or a DCLD, or clear numeric portion only, function signal is later sent to the operator display 18. The operator display 18 will remain in the DRDY, or ready, status while performing the operation of turning on the punctuation light 68.

The DSLD, or accept numeric character, function signal which is sent to the operator display 18 from TCU 12 will cause the numerical information manifested by the next eight bit character applied to the operator display 18 to be displayed in the rightmost position of the numeric portion 62 thereof. Data which already had been displayed will be left-shifted one position.

TCU 12 will keep track of the number of numeric character positions that are filled, and, if more than eight numeric characters have been applied to TCU 12 by the keyboard 16 or the tag reader 14 for any item of information, the leftmost digit is dropped, and only the rightmost eight digits are displayed. If more than 13 digits are entered, an error signal will be indicated by TIC 30, which will tell the operator of the terminal that an error has been made.

The final function signal which can be sent to the operator display 18 from TCU 12 is the DSDD, or accept data descriptor character, function signal, which will be followed by an eight bit character signal telling the display which of the particular messages in the message portion 64 of the display face plate 60 is to be turned on. The eighth bit of the character signal will be meaningless. The fifth, sixth, and seventh bits thereof will indicate which of the rows is to be selected, and the first four bits thereof will indicate which of the columns is to be selected. In this manner, when a row and a column are selected, the intersection thereof will be lighted up. For instance, if the operator display 18 is sent the DSDD, or accept data descriptor character, function signal, followed by a coded word saying that row 2, column 2, is to be displayed, then the message DEPT. will be displayed, and the operator of the terminal will know that the next item of information to be entered is the department number.

Figure 5:
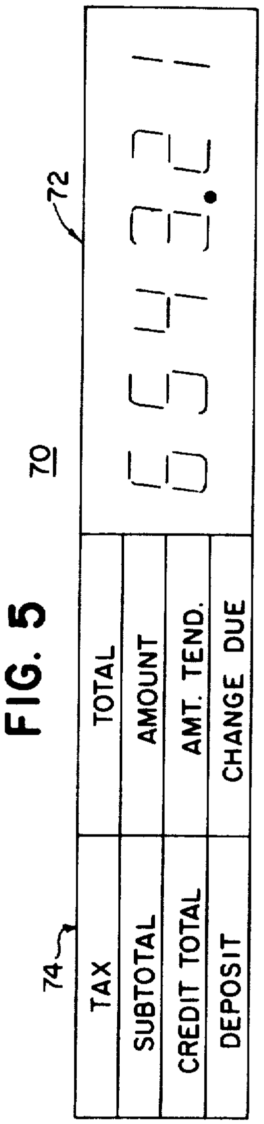
FIG. 5 is a diagram of the display device which the customer sees.

Referring now to FIG. 5, the faceplate 70 of the customer display 20 is shown. The faceplate 70 is divided into a numeric portion 72 and a message portion 74. The customer display 20 is operated in a manner similar to the operator display 18, except that only six numeric digits can be displayed, and the number of messages is only eight. Each of the messages in the message portion 74 indicates the type of information being displayed. The type of information which is to be entered into the terminal by its operator is not displayed on the message portion 74 of the customer display 20. Further, only monetary amounts are displayed on the numeric portion 62 of the customer display 20, and not the inventory control information.

The coin dispenser 22 can be any state-of-the-art coin dispenser with proper interface which can dispense any amount of change up to a maximum of 99 cents. Such a coin dispenser is shown in U.S. Pat. No. 2,972,442, entitled "Automatic Change Dispensing Cash Register," which issued Feb. 21, 1961, on the application of Mayo A. Goodbar et al. filed July 12, 1954. The coin dispenser 22 is connected to the port of TCU 12 which is responsive to port select code "0111" and provides the status signals indicating a ready status or a busy status. It is responsive to a function code "-dispense change" followed by two eight bit character signals indicating the change to be dispensed.

The read/write memory 24 is connected to the port of TCU 12 which is responsive to the port select code "0011." The read/write memory 24 is a core memory having 2,048 cores, into each of which a single bit of binary information may be written and stored. Each of the 2,048 bits is assigned to one of 256 eight bit characters, each character having assigned thereto a certain location number from 0 through 255. Logic means (not shown) within the read/write memory 24 will cause a given location to be selected from which the binary information stored in that location can be read by a first command or into which certain information can be written in response to a second command. Once this given location is selected, a third command will be required to change it.

The read/write memory 24 will provide a single status code RDYC to the TCU 12, indicating that it is ready to perform a given function. In the absence of this code being provided, TCU 12 will understand that the read/write memory 24 is not ready to perform a function.

The read/write memory 24 will respond to one of five coded function signals which can be applied thereto by TCU 12. These signals are the RECA (receive address), the READ (read core character), the AVRD (advance and read core character), the WRIT (write core character), and the ADDR (send present address) function signals.

The first function signal to which the read/write memory 24 will respond is the RECA, or receive address, signal. This function signal will be followed by an eight bit character signal having a code between zero and 256. The read/write memory 24 responds to the RECA function signal and the following character signal by selecting the one location manifested by the following character signal as the then existing read/write memory 24 location. Any further function signals applied to the read/write memory 24 will then be responded to in accordance with this selected location. The location can be changed only by the RECA, or receive address, function signal or the AVRD, or advance and read core character, signal.

The READ, or read core character, function signal will cause the read/write memory 24 to read the information stored in the previously selected location and provide a signal to TCU 12 manifesting this stored information. The AVRD, or advance and read core character, signal will cause the read/write memory 24 to change the selected location to the previous location number plus one. Thereafter, the read/write memory 24 will provide a signal to TCU 12 which manifests the information in the newly selected location. For instance, if the selected location of the read/write memory 24 was an AVRD (advance and read core character) function signal, the read/write memory 24 will cause a signal manifesting the information stored in the character location 01 to be sent to TCU 12.

The WRIT, or write core character, function signal will be followed by an eight bit coded character signal. This function signal, along with the character signal following it, will cause the information manifested by the following signal to be written into the then existing selected read/write memory 24 location. The ADDR, or present address, function signal will cause the read/write memory 24 to send an eight bit character signal to TCU 12 which manifests the then selected address of the read/write memory 24.

The characters stored in the read/write memory 24 are divided into (1) multicharacter transaction control words, each of which controls the entry of data concerning a certain aspect of the transaction which is to be performed by the terminal, (2) a series of storage locations in which certain information may be stored when there is not room for such storage in the TCU 12 registers, such as the tax or non-tax itemizers, and (3) single characters or entire tables of information for providing such things as printer format requirements, or check digit verification constants for certain information applied to the TCU 12 which requires a check digit verification to be performed on the information.

Figure 6:
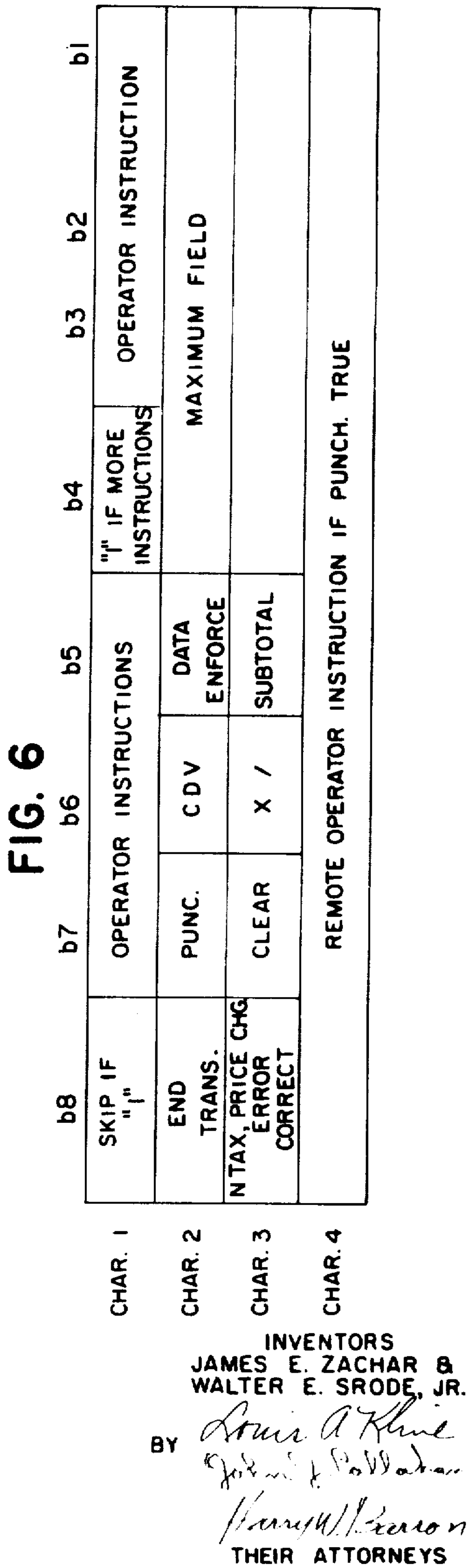
FIG. 6 is a diagram showing an arbitrary word provided by the read-write memory means shown in FIG. 1.

Referring to FIG. 6, there is shown one of the multicharacter transaction control words in a general form. The characters appear along the rows in FIG. 6, and the bits of each character appear in the columns thereof. Each transaction control word will include at least three eight bit characters. In FIG. 6, these three characters are designated as CHAR 1, CHAR 2, and CHAR 3. There is further shown a fourth character, CHAR 4, which is provided when the transaction control word is used for controlling the entry of monetary information data. Each of the bits is designated as *b*1 through *b*8, with bit *b*1 being the least significant bit. Each single bit or plurality of bits in each character will convey certain predesignated information. For instance, in character CHAR 1, bit *b*8, which may be either a logical "0" or a logical "1," indicates whether that particular transaction control word is to be skipped. If the bit *b*8 is a binary "1," then the word with which that bit is associated will be skipped, and TCU 12 will cause the location in the read/write memory 24 to move past each of the characters comprised in that word. This is desirable, for instance, where a store does not yet use each of the three different types of inventory control information outlined above but where it has plans to do so in the future. For instance, where a store would use only department number and class number of a particular item of merchandise, then the transaction control word which regulates the entry and processing of the merchandise number portion of the data information previously explained would have a logical "1" in bit b8 of CHAR 1. This would indicate that there should be no merchandise number display made and that no merchandise number information will be applied to TCU 12. In this case, the sequence of input data would be department number, class number, and the quantity/price. When in the future, however, the inventory control of this store was expanded, so that a number is assigned to each item of merchandise, then, by sending proper signals to the read/write memory 24, the logical "1" bit may be erased therefrom, and a logical "0" bit inserted. In this case, the merchandise number would thereafter appear, and this information would be required.

Bits *b*1 through *b*3 and *b*5 through *b*7 of the character CHAR 1 of the instruction word are a coded signal indicating the message which is to be displayed on the message portion 64 of the operator display 18 face plate 60. The character CHAR 1, in practice, is the data descriptor character sent to the operator display 18 following the DDSD, or accept data descriptor, character function signal sent thereto. The bits 1 through 3 are used to determine which one of the particular columns of information is to be selected, and the bits 5 through 7 are used to determine which one of the particular rows of messages is to be selected. Thus, by having a selected column and a selected row, a certain message will be lit up on the message portion 64 of the display face plate 60.

If bit b4 of the character CHAR 1 is a logical "0," then there are no more messages to be displayed. However, where it is desired to display more than one message on the message portion 64 of the display face plate 60, bit b4 of character CHAR 1 will be a logical "1," and there will be a second character (not shown in FIG. 6) similar to character CHAR 1 which has different coded display information in bits *b*1 through *b*3 and *b*5 through *b*7. In the case of the other data descriptor characters, bit *b*8 will always be a logical "0." In the last characters containing data descriptor information, bit *b*4 will be a logical "0." TCU 12 will process CHAR 1 by always making bit by a logical "0" prior sending the data descriptor character signal to the operator display 18. Bit *b*8 of the data descriptor character is a "don't care" bit.

Bit *b*7 of character CHAR 2 is a logical "1" if the numerical information which is to be displayed requires punctuation; otherwise, bit *b*7 of CHAR 2 is a logical "0." Bit *b*6 of character CHAR 2 indicates that a check digit verification (CDV) is to be performed if it is a logical "1" or that no check digit verification is to be performed if it is a logical "0."

Bit *b*5 of character CHAR 2, when a logical "1," indicates that data must be entered in response to a certain message being displayed on the message portion 64 of the face plate 60. An example of this would be the "Qty/OR × PRICE" message for which data concerning at least the price of the article involved must be entered for the operation to proceed. If no data information is entered, then the error light and tone are activated by TIC 30. Where bit b5 of character CHAR 2 is a logical "0," no data need be entered, although, if entered. it will be processed. An example of this would be the transaction control words which control the nonmerchandise operations, such as allowance, fee, discount, or deposit.

Bits *b*1 through *b*4 of character CHAR 2 are a coded sequence indicating the maximum number of decimal digits which may be entered for a given type of information. For instance, in the case of the department number transaction control word, a code of 0011 may appear in bits *b*4 through *b*1 of character CHAR 2, indicating that the maximum number of decimal digits for the department number code would be three. In this case, if an operator tried to enter a department number of 1234, the error light and tone would be activated in TIC 30, and the data would not be processed. At this point, the operator would have to press the "Clear" key 50 and reenter the proper department number.

Bit b8 of CHAR 2 and bits *b*5 through *b*8 of CHAR 3 are used to lock out certain of the function keys of the keyboard 16 for certain aspects of the transaction. If bit *b*8 of character CHAR 2 is a logical "1," then the TOTAL-END TRANS. key 46 should not be depressed for that aspect of the transaction. If a "1" bit appears in bit *b*8 of character CHAR 3, then the NON TAX key 54, the PRICE CHG. key 52, and the ERROR CORRECT key 48 of the keyboard 16 may not be depressed. Similarly, if a logical "1" appears in bit *b*7 of character CHAR 3, then the CLEAR key 50 may not be depressed; if a logical "1" bit appears in bit *b*6 of character CHAR 3, then the X key 58 and the /FOR key 56 cannot be pressed; and if a logical "1" bit appears in bit *b*5 of character CHAR 3, then the SUBTOTAL key 44 cannot be depressed. The ENTER key 40 is never locked out. Where a logical "0" appears in the bits discussed above, then the function key or keys discussed with respect to that bit are not locked out. If a key locked out by bits *b*5 through *b*8 of CHAR 3 is pressed, then the error light is turned on, and the error tone sounds. At this time, the operator will have to depress the CLEAR key 50 to clear the error condition. If the TOTAL END TRANS. key 46 is pressed when a logical "1" bit appears in bit *b*8 of CHAR 2, the transaction is terminated. Bits 1 through 4 of character CHAR 3 are not used.

Bits *b*1 through *b*8 of character CHAR 4 are used to provide a data descriptor character to the customer display 20. It is present only where bit *b*7 of character CHAR 2 is a logical "1," indicating that a punctuation is necessary.

The printer 26 module is coupled to TCU 12 and can print information at two of three print stations, which include a charge slip station, a journal tape station, or a customer cash receipt tape station. For any given transaction, either the customer cash receipt tape or the customer charge slip will be printed, and the journal tape will always be printed. If desired, the printer 26 can print at all three stations. The printer 26 can be any state-of-the-art printer with the proper interface which an print the required information in these places. An example of such a printer is found in U.S. Pat. No. 1,761,718, entitled "Cash Register," which issued June 3, 1930, on the application of Frederick L. Fuller filed May 23, 1919.

The printer 26 is connected to the port of TCU 12 which is responsive to the port code 0100. The printer 26 continually sends one of four coded status signals to TCU 12 and can accept one of four coded function signals from TCU 12. The status signals which the printer 26 is capable of sending are a RRDY status, which indicates that the printer 26 is ready with a slip inserted; a NSLP status, which indicates that the printer 26 is ready with no slip inserted; a BSY status, which indicates that the printer 26 is busy doing something; or a RJLW status, which indicates that the journal is low and a new roll of paper must be inserted.

The function signals which TCU 12 sends to the printer 26 are a RCLR function signal, telling the printer 26 to clear the printer unit; a RFRM function signal, instructing the printer to accept a format character which will be followed by an eight bit format character signal which tells the printer 26 what type of format to use; a RCAD function signal, instructing the printer 26 to accept an address character which will be followed by an eight bit address character indicative of a particular column address at which the printer 26 is to begin storing data for printing; and a RDAT function signal, instructing the printer 26 to accept the data character which is to be sent as an eight bit data character, indicating the information to be printed. In addition to printing numeric characters relating to the transaction information itself, the printer 26 can also print information such as the date the transaction occurs, letters indicating the meaning of the numeric information printed, the transaction number of this particular transaction, a terminal number designating the particular terminal, and any other type of information which the TCU 12 commands it to print. Some of this information would be printed only on the journal tape, while other of the information will be printed on both of the tapes or the slip and journal tapes being printed.

The output interface modem module 28 is coupled to the port of TCU 12 which is responsive to the code 0000. The output interface modem 28 will take information transmitted thereto in binary form from TCU 12 and convert it into a Frequency Shift Keyed (FSK) type of information which is transmitted over telephone lines to the data collector 10. The interface logic of the output interface modem 28 is a standard type of interface which responds to the ASCII character pneumonics such as the EXT or EOP signals to cause TCU 12 to provide the proper signals at the proper times.

The output surface modem 28 is responsive to seven different coded function signals sent thereto by TCU 12 and provides five different coded status signals to TCU 12. The function signals to which the output interface modem 28 is responsive are (1) an MPO function signal, which instructs the output interface modem 28 to enter into a monitor mode for an output poll, (2) an MEI function signal, which instructs the output interface modem 28 to enter into a monitor mode and establish a line for an input poll, (3) an MEO function signal, which instructs the output interface modem 28 to enter the monitor mode and establish a line when the output is polled for credit authorization, (4) an IST function signal, which instructs the output interface modem 28 to enter an input mode and establish a line if the output is polled, (5) an OST function signal, which instructs the output interface modem 28 to enter an output mode and select for data transfer, (6) and SBA function signal, which instructs the output interface modem 28 to start the Block Character Check (BCC), and (7 ) an MEC function signal, which instructs the output interface modem 28 to enter the monitor mode and establish a line for data collection. The IST function signal conditions the output interface modem 28 to send characters to the data collector 10, while the OST function signal conditions the output interface modem 28, to receive characters from the data collector 10. The SBA function signal is used to start BCC to check the data and to insure that proper data will be transmitted from the output interface modem 28. The MEO function signal allows the terminal to communicate with a central facility for an on-line, real-time credit check of the status of a waiting customer's charge account.

The status signals which the output interface modem 28 can transmit to TCU 12 are (1) a BSY status, which indicates that the output interface modem 28 is busy executing or receiving; (2) a BPO status, which indicates that it is busy and has been polled for output since the monitor code was entered; (3) a RDY status, which indicates that the output interface modem 28 is ready for TCU intervention; (4) a RDE status, which indicates that it is ready with the data collector 10 output character but that the character has BCC, character parity, or overload error; and (5) an NPT status, which indicates that the output pilot tone has been dropped.

The output interface modem 28 communicates with the data collector 10 using standard ASCII control characters which are seven bits in length. The message format for each character is a 10 bit data signal which begins with a start of character bit, followed by the seven data bits, and ending with a parity bit and a stop bit. The transmission is serial by bit and by character, with the least significant bit of the most significant character being transmitted first.

Different types of data are separated by sending a character separator, which may be a file separator, (FS), a group separator (GS), a record separator (RS), or a unit separator (US). Every data message to be recorded will start and stop with an FS character being sent. The other three character separators (namely, the GS, the RS, and the US) can be used as desired to separate certain different groups of data. For instance, a GS could be used to separate certain types of data not relating to the particular items sold, such as the store number or the terminal number, resulting from information relating to the type of information sold. An RS separator could be used to further separate the information into smaller groups which still include more than one type of information. Finally, the US would be used to separate each different type of message which would include several characters. Thus, a message could include four characters indicating the store number, then a US character, four more characters indicating the terminal number, then an RS character, then four characters indicating a media number, a US character, two characters indicating a transaction type, a US, six characters indicating the operator's ID number, a GS, two characters indicating a particular format, a US, a single character indicating an item code, a US, three characters indicating a department number code, a US, and so forth until the price of the item indicated by six characters followed by an RS. Thereafter, a GS could occur, indicating certain non-merchandise-type entries, such as discounts, fees, allowances, deposits, or tax amounts, followed by another GS character, in which the total of the sale, with the account number and credit authorization code, would be transmitted, followed finally by an FS. This information all would relate to a single sale of possibly several items, with several different aspects of the sale being included.

A further function that the output interface modem 28 performs is to indicate to TCU 12 that, for one reason or another, the terminal has gone offline; that is, it is no longer communicating with the data collector 10. In this case, the terminal could continue to operate, and all necessary information would be recorded on the journal tape which is printed by the printer 26 and would have a special symbol designating it as information not sent to the data collector 10. At a later time (for instance, after store closing hours), when the data collector has been fixed and the terminal again is online, the information which was not originally sent to the data collector 10 may be fed through in what is called a reentry transaction, to be then recorded on the data collector 10 and processed as required.

Thus, even though the terminal goes offline, it is still possible to operate it and to maintain a record of the necessary information. This feature will greatly simplify the entire terminal system for a store, and, further, it will reduce the cost, because it is not necessary to provide backup equipment, such as a second large digital computer, in case the data collector 10 goes offline.

The final module which is connected to TCU 12 is a terminal indicator control 30 (TIC), which controls different elements, such as the cash drawer 32, the qualification panel 34, and various lights, tones, and keylocks 36. TIC 30 is responsive to the port code signal 0101.

TIC 30 sends a single status code to TCU 12 which indicates that it is in an operable status. If this status code is not sent, TCU 12 recognizes that TIC 30 is in a non-operable status or that it is not on the port for one reason or another. TIC 30 responds to nine coded function signals which may be sent thereto from TCU 12.

One of the function signals is the TDAT signal, which instructs TIC 30 to send data to TCU 12 in the form of an eight bit character signal. If the first bit of this character is a logical "1," this indicates that the keylock to operate the terminal in a normal manner has been turned on. If bit 2 of the data provided by TIC 30 is a logical "1," this indicates that the read keylock has been turned on, and this is used during the closing operation of the terminal. In this event, the permanent totals stored in the read/write memory 24 will be displayed and printed. If bit b3 of the TIC 30 data is a logical "1," this indicates that the reset keylock has been turned on, and this also occurred during the closing operation and causes the permanent totals stored in the terminal to be printed and read and thereafter reset to zero. If bit *b4* of the data provided by the TIC 30 is a logical "1," this indicates that the cash drawer is open. Finally, if bit *b5* of the data provided by TIC 30 is a logical "1," this indicates that the program keylock has been turned on and that information stored in the read/write memory 24 is to be either read or changed. A more detailed description of the programming operation will be given hereinafter.

The second function signal which is applied to TIC 30 from TCU 12 is a TONE signal, which causes TIC 30 to generate an audible tone which may be used when a key on the keyboard 16 is depressed to allow the operator of the terminal to know that the key has been fully depressed and the information transmitted to TCU 12. The third function signal applied to TIC 30 is an MTNE signal, which causes a mixed audible tone for use as the audible error signal to be generated. The fourth function signal which is applied to TIC 30 is an OCDW signal, which causes TIC 30 to energize a solenoid to open the cash drawer. A fifth function signal applied to TIC 30 is an RSET signal, which causes TIC 30 to deenergize the solenoid for closing the cash drawer.

A sixth function signal sent to TIC 30 is the SLA1 signal, which causes the qualification panel light to be turned on, and a seventh function signal is the RLA1 signal, which causes the qualification panel light to be turned off. The eighth and ninth function signals, respectively, are the SLA 2 and RLA 2 signals, which respectively cause the error light to be turned on or the error light to be turned off.

Figure 2:
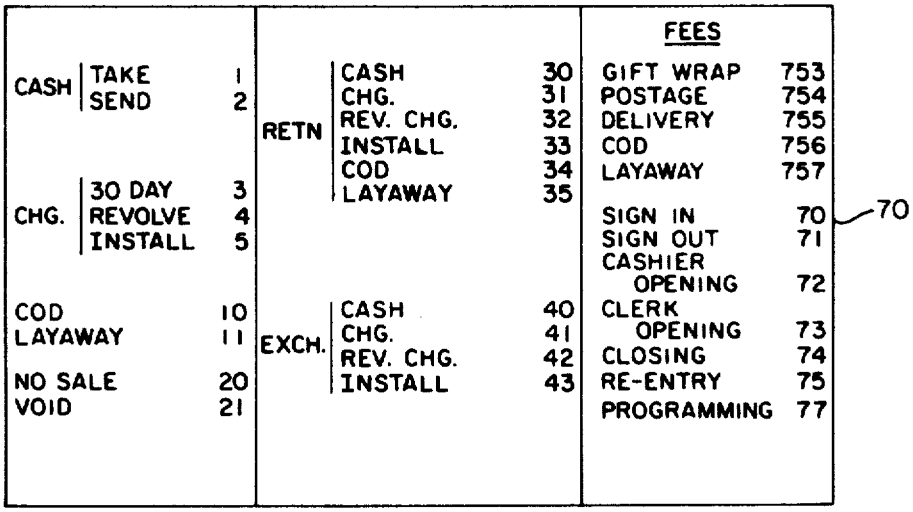
FIG. 2 is a diagram of the qualification panel portion of a terminal.

FIG. 2 shows the qualification panel 30 face plate 70. Various types of transactions can be performed by the terminal C–280, and each particular one is given a numeric code. For instance, for a cash sale or a "cash take" transaction, the qualification code is a decimal "1." If no qualification code is pressed, then TCU 12 will assume that the transaction is a cash sale and will insert the binary equivalent of a decimal "1" into itself in place of the qualification signal. If an item is being delivered to the home of the customer, then a "cash send" transaction is taking place, and the qualification would be a decimal "2." Similarly, charge sales can be either qualifications "3," "4," or "5," depending on the type of account. COD, Lay-Away, No Sale, and Void sales would be respectively provided with qualification codes of "10," "11," "20," or "21." Where an item is returned, the qualification code would be between "30" and "35," depending on the type of the transaction, and, where an item is exchanged, the qualification code would be between "40" and "43." Special types of qualifications, such as sign in/sign out, cashier opening, clerk opening, closing, reentry, and programming, some of which must be accomplished through the additional use of turning a keylock, are given the qualification codes between "70" and "77." The various types of fees which are listed as numbers 753 through 757 are not qualification numbers but, rather, are used later on during the transaction where it is necessary to identify the fee type.

Figure 7:
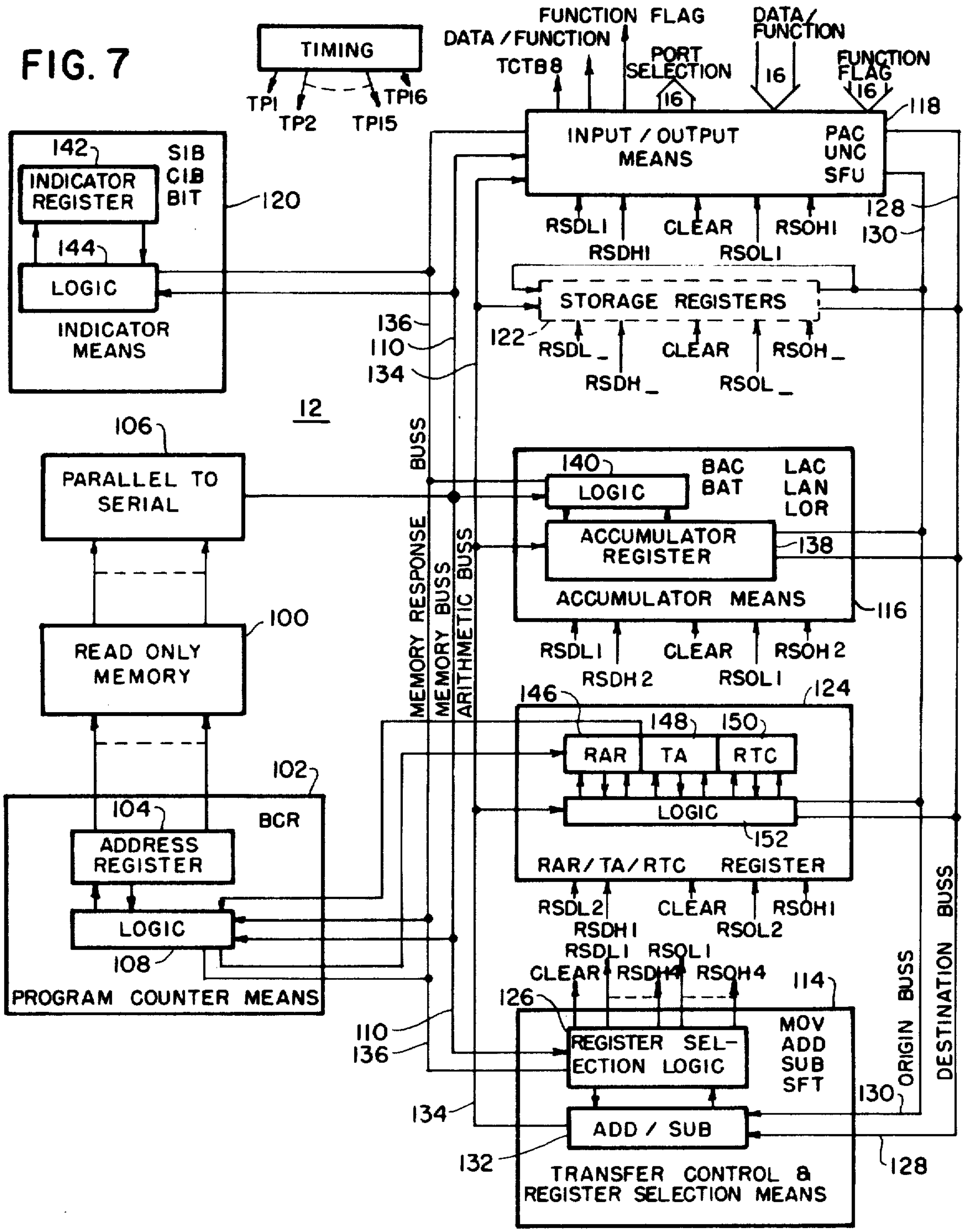
FIG. 7 is a diagram of the terminal control unit shown in FIG. 1.

Referring now to FIG. 7, there is shown a block diagram of TCU 12. As previously mentioned, a detailed description of TCU 12 is given in the aforementioned Haney et al. United States patent application. FIG. 7 serves merely to illustrate the functional operation of TCU 12 and is not intended to show a detailed logical description thereof.

TCU 12 is basically a small digital computer. It can perform any one of 22 different logical operations in response to a given instruction which is provided from the read-only memory 100. The read-only memory 100 contains 4,096 12 bit instruction characters. As used herein, the term "read-only memory" is a memory in which given stored information can be read at electronic speeds, but it cannot be changed at electronic speeds. Where given stored information can be changed at electronic speeds as well as read at electronic speeds, it is considered to be stored in a read/write memory such as the read/write memory 24. A word from any given location can be read from the read-only memory 100, and the location from which the word is read is determined by the program counter 102.

The program counter means 102 comprises an address register 104, which provides fifteen separate signals to the read-only memory 100 to cause the bits located in a given location thereof to be transferred in parallel to a parallel-to-serial converter 106. The program counter means 102 further includes address control logic circuitry 108, which determines what the particular count in the address register 104 is to be.

The output from the parallel-to-serial converter 106 is applied to a memory buss 110. The instruction signal appearing on the memory buss 110 will be a 12 bit serial by bit coded instruction signal which can be in the form of any one of five different formats. Referring now to FIGS. 8, 9, 10, 11, and 12, these five different formats of the instructions are shown.

FIG. 8 shows the SPOP format instruction signal, which in fact is a two-character instruction. The instruction having this format is used for the unit control commands which TCU 12 can perform. Bits b1 through b4 of the first character of the instruction contain the operation code OP of this instruction. This code is a four bit code which defines which one of the 16 possible instruction signals is then occurring. Bits *b*5 through *b*8 of the first character of the SPOP type of instruction contain a P code designating a certain one of the sixteen ports of TCU 12, and bits *b*9 through *b*12 for the first character of the SPOP type of instruction contain a four bit code indicative of a certain status which can be sent by the port designated by bits *b*5 through *b*8. Bits *b*1 through *b*4 of the second character of the SPOP instruction contain a four bit F code indicative of a particular function which the unit coupled to the selected port can perform. Bits *b*5 and *b*6 are an I.T. code, and each of I and T may be either 0 or 1, and the combination of them can be used to divide the main instruction defined by the operation code in bits *b*1 through *b*4 of the first character into four subinstructions. Bits *b*7 through *b*12 of the second character contain a constant number RA, which may be either plus or minus 31 in value, where bit *b*12 determines the sign and bits *b*7 to *b*11 determine the value.

Figure 9:
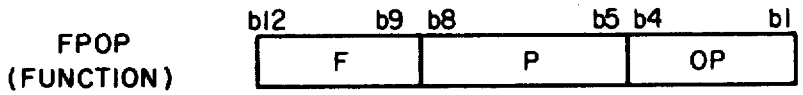

Referring to FIG. 9, the FPOP instruction format in shown, and it is used as a function instruction. Bits *b*1 through *b*4 of this instruction contain the operation code OP which indicates the type of instruction. Bits *b*5 through *b*8 contain a port code P for selecting one of the particular ports, and bits *b*9 through *b*12 contain an F code conveying which function is to be issued to the particular port.

Figure 10:
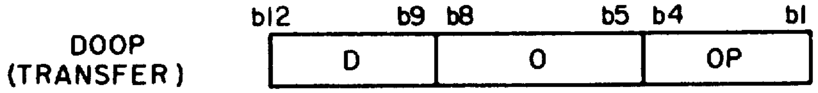

FIG. 10 shows the DOOP instruction format, which is used as a transfer instruction. Bits *b*1 through *b*4 contain the operation code OP of this type of instruction. Bits *b*5 through *b*8 contain a 0 code designating one of the data registers in TCU 12 as an origin register, and bits *b*9 through *b*12 convey a D code designating one of the registers in TCU 12 as a designation register.

Figure 11:
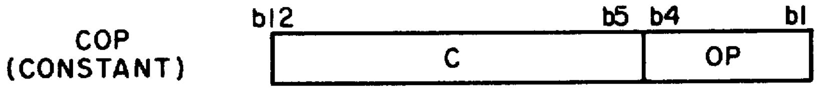

FIG. 11 shows the COP instruction format, which has the operation code OP thereof in bits *b*1 through *b*4. Bits *b*5 through *b*12 thereof contain an eight bit binary-coded constant number C.

Figure 12:

FIG. 12 shows the RAOP instruction format, which is used for causing a branch in the program to occur. Bits *b*1 through *b*4 have an operation code Op therein. Bits b5 and *b*6 are an AB code where each of A and B may be either a logical "0" or a logical "1." These numbers can be used to divide the main instruction defined by the OP code into four subinstructions. Bits *b*7 through *b*12 contain a RA constant which may be plus or minus 31, where bit *b*12 determines the sign and bits *b*7 to *b*11 determine the value.

It is seen from FIGS. 8 through 12 that, in each of the five different instruction formats, there is a four-bit operation code OP as one portion of these instructions. Since there are four bits here, this means that there are 16 different main instructions possible for TCU 12. Further, it should be noted that from FIGS. 8 and 12 there are additional codes; namely, the codes in portions I and T in FIG. 8 and the codes in the portions A and B in FIG. 12, which would indicate that instructions having operation codes of the types of the SPOP or RAOP instructions can have four subinstructions for each main instruction.

Table I, which is set out below, shows the different types of instructions, subinstructions, and variations which may be used in TCU 12:

TABLE I

| NAME | Format | OP | OPERATION |
|---|---|---|---|
| 1. Port Address Control (PAC) | | | |
| -. PAL (C = 00000001) | COP | 0000 | AC → PORT Address Register and Hold |
| B. PAR (C = 00000010) | COP | 0000 | Release Port Address |
| 2. Clear indicator Bit (CIB) | COP | 0001 | (IND) · C → (IND) |
| 3. Move Character(MOV) | | | |
| A. D,O ≠ 0 | Doop | 0010 | $(Ro)_N \rightarrow (Rd)_1$, AC, $(Ro)_1$ |
| B. D,O = 0 | DOOP | 0010 | AC → DO—$(Ro)_N \rightarrow (Rd)_1$, AC,$(Ro)_1$ |
| 4. Branch on Accum. Char. (BAC) | COP | b 0011 | Branch if AC = C |
| 5. Load Accum. (LAC) | COP | 0100 | C → AC |
| 6. Set Ind. Bit (SIB) | COP | 0101 | (IND) + C → IND |
| 7. Add Binary (ADD) | | | |
| A. D,O ≠ O | DOOP | 0110 | $(Ro)_N + (Rd)_N \rightarrow (Rd)_1$, AC; $(Ro)_N$ $(Ro)_1$ |
| B. D, O = 0 | DOOP | 0110 | AC → DO−$(Ro)_N$+ $(Rd)_N \rightarrow (Rd)_1$, AC |
| 8. Branch on Accum. Bits True (BAT) | COP | 0111 | Branch if for all Ci = 1, (AC) = 1 |
| 9. Logic OR (LOR) | COP | 1000 | AC + C → AC |
| 10. Set Function (SFU) | FPOP | 1001 | Issue F on port P |
| 11. Subtract Binary (SUB) | | | |
| A. D,O = 0 | DOOP | 1010 | $(Rd)_N - (Ro)_N \rightarrow (Rd)_1$, AC; $(Ro)_N$ $(Ro)_1$ |
| B. C,O = 0 | DOOP | 1010 | AC → 00—$(Rd)_N$ − $(Ro)_N \rightarrow (Rd)_1$, AC |
| 12. Branch on IND Bits True (BIT) | COP | 1011 | Branch if for all $C_i$ = 1, $IND_i$ = 1 |
| 13. Logic AND (LAN) | COP | 1100 | AC · C → AC |
| 14. Unit Control (UNC) | | | |
| A. FFB (I = 1, T = 1) | SPOP | 1101 | If US ≠ S Send F on P; otherwise branch |

| | | | |
|---|---|---|---|
| B. FTB (I = 1, T = 0) | SPOP | 1101 | If US = S Send F on P; otherwise branch |
| C. BSF (I = 0, T = 0) | SPOP | 1101 | If US ≠ S Branch by RA; otherwise continue |
| D. BST (I = 0, T = 1) | SPOP | 1101 | If US = S Branch by RA; otherwise continue |
| 15. Shift Character (SFT) | | | |
| A. SFT D,O ≠ 0 | DOOP | 1110 | $(Ro)_J \rightarrow (Ro)_{J+1}$, $(Ro)_N \rightarrow (Ro)_1$ |
| B. SFT D,O = 0 | DOOP | 1110 | $AC \rightarrow DO - (Ro)_J \rightarrow (Ro)_{J+1}$, $(Ro)_N$ $(Ro)_1$ |
| C. CLR D,O ≠ 0 | DOOP | 1110 | $Ro \rightarrow 0$ |
| D. CLR D,O = 0 | DOOP | 1110 | $AC \rightarrow DO - Ro \rightarrow 0$ |
| 16. Branch Unconditional (BCR) | | | |
| A. BUC (A = 0, B = 1) | RAOP | 1111 | $Pc + RA \rightarrow PC$ |
| B. BSR (A 1, B = 1) | RAOP | 1111 | $Pc + \rightarrow RA, PC \rightarrow INST. + 1$ |
| C. BIR (A 0, B = 0) | RAOP | 1111 | $RAR = RA \rightarrow PC$ |
| D. BIS (A = 1, B = 0) | RAOP | 1111 | $PC \rightarrow RAR, RAR + RA \rightarrow PC$ |

From Table I, the 16 main instructions have respective operation codes from 0000 through 1111. It is further seen that some of these instructions have several variations associated with the main instruction. For instance, the main instruction numbered 14 is the unit control (UNC) instruction, and there are four possible versions (or subinstructions) for this main instruction, which depend on the particular values of the I and T portions of the SPOP type of instruction. For instance, the FFB instruction signal will be provided when both I and T are equal to a logical "1." Similarly, the FTB version of the UNC instruction is where I equals a logical "1" and equals a logical "0." Each of the instructions shown in Table I will be discussed in more detail hereinafter when other portions of TCU 12 are discussed.

Referring again to FIG. 7, the memory buss 110 is connected to the transfer control and register selection circuit 114, the accumulator means 116, the input/output means 118, the indicator means 120, and the program counter means 102. The elements 102, 114, 116, 118, and 120 are capable of responding to certain of the operation codes OP of the series instructions. Transfer control means and register selection means 114 will respond to the MOV, the ADD, the SUB, and the SFT instructions in a manner to be described hereinafter; the accumulator means 116 will respond to the LAC, the LAN, the LOR, the BAC, and the BAT instructions; the input/output means 118 will respond to the PAC, the UNC, and the SFU instructions; the indicator register means 120 will respond to the SIB, the CIB, and the BIT instructions; and the program counter means 102 will respond to the BCR series of instructions.

There is further provided in TCU 12 a series of storage registers 122, which are shown in FIG. 7 as a single register in a dashed line block. There may be 16 selectable registers altogether in TCU 12. One of these sixteen selectable registers is a special register called the RAR/TA/RTC register 124, which will be described hereinafter. The accumulator means 116 is a second register included as one of the 16 selectable registers, and an input buffer register (not shown) is included as a part of the input/output means 118 and is also one of the 16 selectable registers. Thus, the registers in the storage registers 122 may be any number up to 13. These registers in the storage register 122 may be any number of eight bit character in length. In TCU 12, there are nine registers included in the storage registers 122. These nine registers include the single character CNT1, SC1, IND1, and IND2 registers, the two character DC1 and DC2 registers, the six character HCl and HC2 registers, and the 14 character HOLD register.

Each of the registers in TCU 12 may be selected as either an origin register or a destination register by the register selection means 126, which is a part of the transfer control and register selection means 114. Where a register is selected as a destination register, it is made to apply its most significant character in a serial by bit manner, least significant bit first, to a destination buss 128, and, where it is selected as an origin register, it will apply its most significant character in serial by bit manner, with the least significant bit first, to the origin buss 130. The origin and destination busses are connected to each of the selectable registers and also to the ADD/SUB means 132, which is a portion of the transfer control and register selection means 114. The output of the ADD/SUB means 132 is applied to an arithmetic buss 134, which in turn is applied to each of the selectable registers.

Another buss line, called the memory response buss 136, is provided, and it is connected from each of the elements 102, 114, 116, 118, and 120 which responds to the instructions to the program counter means 102.

When a MOV instruction signal is provided from the read-only memory 100 to the parallel-to-serial converter 106 and from there to the memory buss 110, the register selection logic 126 will detect and respond to the OP portion of that instruction. Since the MOV instruction is of the DOOP type, there will be an origin code O and a destination code D associated with the instruction. The register selection logic 126 will respond to the origin and destination codes of the instruction signal and cause one of the selectable registers to be selected as an origin register and one of the selectable registers to be selected as a destination register. The register selected as the origin register will apply its most significant character to the origin buss 130. The characters in the origin register will also be circularly shifted one character position in that register. The ADD/SUB means 132 will be caused by the register selection logic circuit 126 to respond to the signal appearing on the origin buss 130 and apply a signal to the arithmetic buss 134 which is identical to the signal appearing on the origin buss 130. The register which was selected as the destination register will respond to the signal appearing on the arithmetic buss 134 and will store the eight bit character manifested by this signal in its least significant character position. All other characters, if any, in the selected destination register will be shifted up one character in significance. The most significant character in that register will no longer be stored.

When the MOV command is recognized by the transfer control and register selection means 114, the accumulator register 138, if not selected as the destination register, will be responsive to the character appearing on the arithmetic buss 136 to cause it to replace any character previously stored in the accumulator register 138 of the accumulator means 116. Thus, with a single MOV instruction, a character may be moved from one register to another for one purpose and at the same time be moved into the accumulator register 138 for another purpose.

The ADD and SUB instructions are also recognized by the transfer control and register selection means 114 and are similar in nature to the MOV command. However, in the case of the ADD and SUB commands, the origin and destination registers both will cause their most significant character to be applied respectively to the origin buss 130 and the destination buss 128. The ADD/SUB means 132 will respectively either add the information manifested by the signals appearing on the origin and destination busses 130 and 128, or subtract the information manifested by the signal appearing on the origin buss 128 from the information manifested by the signal appearing on the destination buss 130 and apply a signal manifesting the added or subtracted information to the arithmetic buss 134. The selected destination register and the accumulator register again will respond to the signal appearing on the arithmetic buss 134 and store the information in its least significant character position.

Another option which is possible in the case of the MOV, and ADD, and the SUB commands is that, where the origin code and the destination code of the instruction signal are both binary zero, the eight bit character in the accumulator will be transferred to the register selection logic 126 and will determine which of the registers is to be selected as the origin register and which as the destination register.

Where a shift SFT instruction signal is applied to the memory buss 110, the register selection logic 126 will respond thereto. In the case of the SFT command, the code in the 0 portion of the instruction code will determine which register is to be selected, and the code in the D portion of the instruction will determine how many character positions are to be shifted. Thus, where the D portion would be, for instance, 3, and the 0 portion would be, for instance, 5, then the register 5 would have the characters stored therein shifted three character positions. If the D and O portions of the SFT command are both O, then the character stored in the accumulator 138 will be applied to the register selection logic 126, and this character will determine the register to be selected and the number of shifts to be made. If the D portion only of the instruction is zero, then the selected register will be cleared of all characters stored in that register.

In the case of each of the MOV, the ADD, the SUB, and the SFT instruction signals, the register selection logic 126 sends a signal on the memory response buss 136 indicating to the program counter means that the next instruction should be read.

As previously mentioned, the accumulator means 116 responds to the LAC, the LAN, the LOR, the BAC, and the BAT instructions. Where an LAC instruction is applied to the memory buss 110, the logic portion 140 of the accumulator means 116 will decode this instruction. This instruction is of the COP type and indicates that the eight bit C portion of the instruction is to be loaded into the accumulator.

When an LAN instruction is sent on the memory buss 110, the logic portion 140 of the accumulator means 116 will respond thereto by performing a logical AND function between the C portion of the instruction and the character stored in the accumulator register 138. Similarly, where the LOR instruction is sent, the logic portion of the accumulator means 116 will perform a logical OR on the C portion of the instruction and the contents of the accumulator. In the case of both the LAN and the LOR instructions, the resulting logical AND or logical OR will be placed back in the accumulator register for storage.

In the case of the LAC, LOR, and LAN instructions, a response is sent on the memory response buss 136 by the logic circuit 140, indicating to the program counter means 102 to read the next instruction from the read-only memory 100.

When a BAC instruction is provided on the memory buss 110, the logic portion 40 of the accumulator means 116 will respond thereto by performing a test to see whether the character stored in the accumulator register 138 is identical with the C portion of the instruction. similarly, Similarly, where the BAT instruction is applied to the memory buss 110, the logic portion 40 of the accumulator means 116 will perform a test between the contents stored in the accumulator and the C portion of the instruction to determine whether for each logical "1" in the C portion of the instruction there is a comparable logical "1" stored in the accumulator register.

If the results of the test performed in response to the BAC or the BAT instruction signals is positive, then a response is sent on the memory response buss 136 to instruct the program counter means 102 to branch to the address defined in the next higher location of the read-only memory 100. If the test result were negative, a response is sent on the memory response buss 136 to instruct the program counter to skip the next location of the read-only memory 102 and to continue normally thereafter.

If a PAC instruction signal is applied to the memory buss 110, the input/output means 118 will decode this instruction and respond thereto to transfer the contents of the accumulator to the input/output means 118. The input/output means 118 will then look at bits b1 through b4 of the accumulator character and at the C portion of the PAC instruction. If the C portion is a 00000001 binary code, the input/output means 118 will cause a port defined by bits *b*1 through *b*4 of the accumulator character to be locked on. On the other hand, if the C portion of the PAC instruction had been a 00000010 binary code, then any locked-on port will be released.

The input/output means 118 will also decode the UNC series of instruction signals, and for these instructions the input/output means 118, after decoding the OP portion of the instruction, will look at the I and T portions of the instruction. From this it can determine whether the instruction is the FFB, the FTB, the BSF, or the BST subinstruction. If it is determined that the UNC instruction applied is the FFB or the FTB subinstruction, then the input/output means 118 will determine from the P portion of the instruction signal a particular port to select, and it will compare the status signal applied from the unit connected to this port with the code in the S portion of the instruction signal. In the case of the FFB subinstruction, if the code for the status applied from the unit is not equal to the code contained in the S portion of the instruction signal, then the input/output means 118 will send the function defined by the code in the F portion of the second character of the instruction to the selected port. It would also send a response on the memory response buss 136 indicating to the program counter means 102 that no branch is to occur. If the status applied to the port were equal to the status in the S portion of the instruction, then a response on the memory response buss 136 would be sent to the program counter means 102 to cause a branch by the RA portion of the SPOP instruction.

The FTB version of the UNC instruction is opposite to the FFB, and in this case, if the statuses compare equal, the function is sent; and if they are unequal, a branch response on the memory response buss 136 would be sent.

The BSF and BST subinstructions of the UNC instruction are also similar but opposite. In this case of the BSF, if the compared statuses are unequal, then a branch response is sent on the memory response buss 136 to cause the program counter means to branch by the RA amount; otherwise a continue the normal program response is set on the memory response buss 136. For the BST subinstruction, if the status is compared equal, a branch response is sent to cause a branch by RA, and if they are unequal, then a normal operation response is sent.

The final type of instruction to which the input/output means 118 responds is an SFU instruction, which has the FPOP format and which causes a certain function determined by the F portion of the instruction signal to be sent to a certain port determined by the P portion of the instruction signal. An example of this type of instruction would be to cause the printer to print a character. In this case, the port code would be 0100, indicating the port to which the printer is connected, and the function code would be for the RDAT function, which instructs the printer 26 to accept a data character. After this instruction, instructions would occur to cause a data character to be sent from one of the registers or from the memory itself to the printer 26.

The indicator register means 120 will respond to the SIB, the CIB, and the BIT instructions. Where an SIB instruction is provided on the memory buss 110, the indicator register means will cause a logical OR to be performed between the contents of the indicator register and the C portion of the SIB instruction signal. Similarly, where a CIB instruction is sent indicating that at least one bit in the indicator register is to be cleared, a logical AND function will be performed between the contents of the indicator register and the C portion of the CIB instruction signal. In both cases, the result of either the logical AND or the logical OR will be stored in the indicator register 142 of the indicator register means 120. The response on the memory response buss 136 for the SIB or the CIB instructions is to read the next instruction.

When a BIT instruction appears on the memory buss 110, then the logic 144 of the indicator register means 120 will perform a test to see whether, for each logical "1" bit in the C portion of the instruction signal, there is a corresponding logical "1" bit stored in the indicator register 142. The response on the memory buss 136 for this instruction is the same as it was for the BAC or BAT instructions.

The program counter means 102 will respond to the BCR instruction signals, which are branch type instructions. As seen from Table I, there are four different subinstructions for the BCR instruction, and they depend on the values of A and B in the RAOP type instruction shown in FIG. 12. The BUC subinstruction signal will cause an unconditional branch in the program by the RA constant.

The BSR subinstruction will cause a branch to a location determined by the contents of the next higher read-only memory 100 location. At the same time, the contents of the address register 104 is increased by "1" and stored in the RAR portion 146 of the RAR/TA/RTC register 124. When a BIR subinstruction signal occurs, the contents of the RAR portion 146 of the RAR/TA/RTC register 124 is applied back to the program counter means 102 and causes the address register 104 thereof to go back to the portion of the program from which it was branched by the BSR instruction. Finally, the BIS subinstruction will cause the contents of the address register 104 to be transferred to the RAR portion 146 of the RAR/TA/RTC register 124 and at the same time will cause the contents of the RAR portion 146 of the RAR/TA/RTC register 124 to be transferred back to the address register 104. In both the BIR and the BIS types of BCR instructions, when the contents of the RAR portion 146 of the RAR/TA/RTC register 124 is transferred back to the address register 104, the information may be modified by the RA factor before being placed in the address register. Thus, one may cause a branch in the main program by the BSR instruction and later cause the program to return to the main program at the same point as or at a different point from where the branch occurred.

As previously mentioned, the RAR/TA/RTC register 124 is a special type of register. It is a six character register, but there is no shifting between various portions of it. It may well be thought of as three separate registers — as RAR register 146, a TA register 148, and an RTC register 150. When the contents of the address register 104 are stored in the RAR/TA/RTC register 124, they are stored in the RAR portion thereof. The RAR portion is a two character shift register, and the 12 bit address of the address register 104 is stored in the entire eight bits of the least significant character and in the four least significant bits of the most significant character of the RAR register 146.

The TA register 148 is not really a register. It may be a series of flip-flop circuits which can provide a constant number upon command. This number will never change and could be used, for instance, as the store number or the terminal number of the C-280 terminal.

The RTC register 150 is used as a real time clock and can be programmed to initially store an eight bit constant number and thereafter to decrement the contents by "1" each TCU 12 cycle time. Thus where, for instance, one wishes to sound a tone for a given time, one could load a constant value into the RTC and sound the tone until the RTC reaches zero.

The logic portion 152 of the RAR/TA/RTC register 124 includes a series of pointers to select which of the three registers (RAR register 146, TA register 148, or RTC register 150) is to be used when the RAR/TA/RTC register 124 is selected by the register selection means 126. If, for instance, it is desired that the second character of the RAR register be checked, then the pointer referring to that character would be on, and the remaining pointers would be off. After one TCU 12 cycle time has passed, the pointer originally on would go off, and the pointer pointing to the next lower in significance character of the RAR/TA/RTC register 124 would go on. This procedure continues.

When an SFT command is given and the RAR/TA/RTC register 124 is selected, then the pointer having the number associated with the D portion of the SFT instruction is turned on. If a CLR instruction signal is sent to this register 124, then the pointer for the most significant character of the RAR register will be on.

Reference to FIGS. 13A through 13I shows a flow diagram illustrating the sequence of operating the C-280 terminal. The symbology used in FIGS. 13A through 13I is given in FIG. 14.

Referring to FIG. 13A, the first thing which is necessary is that the operator must enter the qualification type of transaction which he reads from the qualification panel. This is shown by the symbol 200. The large block 201 to the left of the symbol 200 labeled "Qualification Panel" indicates that at this time the qualification panel 34 will be turned on. Hereinafter, where a block is shown connected by a dashed line to a symbol referring to an operator requirement, it will signify that either the qualification panel or a message is turned on at this point to guide the operator through the transaction.

After the operator enters the qualification of the transaction, the terminal will have to decide (1) whether this is an opening transaction and (2) whether it is a cashier or a clerk type terminal, as indicated by the symbols 202 and 204, respectively. If the terminal decides that the qualification is for an opening transaction, the next thing which will be required is that the identification number be entered by the operator as seen by the branch line 206 going to the symbol 210.

If at symbol 202 the terminal determined that this was not an opening, then the symbol 204 indicates that a decision must be made by the terminal as to whether the terminal is operating as a clerk terminal or a cashier terminal. If the terminal is a cashier terminal, the next thing which must be determined is whether it is a special transaction, as indicated by the branch line 208 going to the symbol 214. If the terminal is a clerk terminal, or if the transaction is an opening transaction, then the symbol 210 requires that the identification number of the operator be entered through the keyboard. If the terminal is a cashier terminal (that is, one where there is only one operation), the identification number is stored in the read/write memory 24, and, on all transactions except opening, it is automatically read from the read/write memory 24 when required. For a clerk terminal (that is, several operators of the same terminal), the identification number must always be entered. The symbol 212 indicates that the terminal will then decide whether it is necessary to perform a check digit verification on the identification number so entered. This would be accomplished by looking at bit b6 of the character CHAR 2 of the read/write memory 24 transaction control word for the identification number sequence to determine whether the check digit verification is necessary. If it is necessary, which it is in the case of the identification number, then the terminal will perform the check digit verification to determine that the identification number is valid. If it is not valid, the terminal will indicate that an error has been committed and require the operator to re-enter his identification number, and the same sequence will be repeated until the number is properly entered.

Assuming that the identification number is valid, the next thing which the terminal will decide, as indicated by the symbol 214, is whether the qualification number entered at the symbol 200 indicates a special type of transaction or a merchandise transaction. Assuming for the moment that the type of transaction is a normal merchandise transaction, the flow diagram continues in FIG. 13B at the point labeled "Merchandise".

Figure 13B:
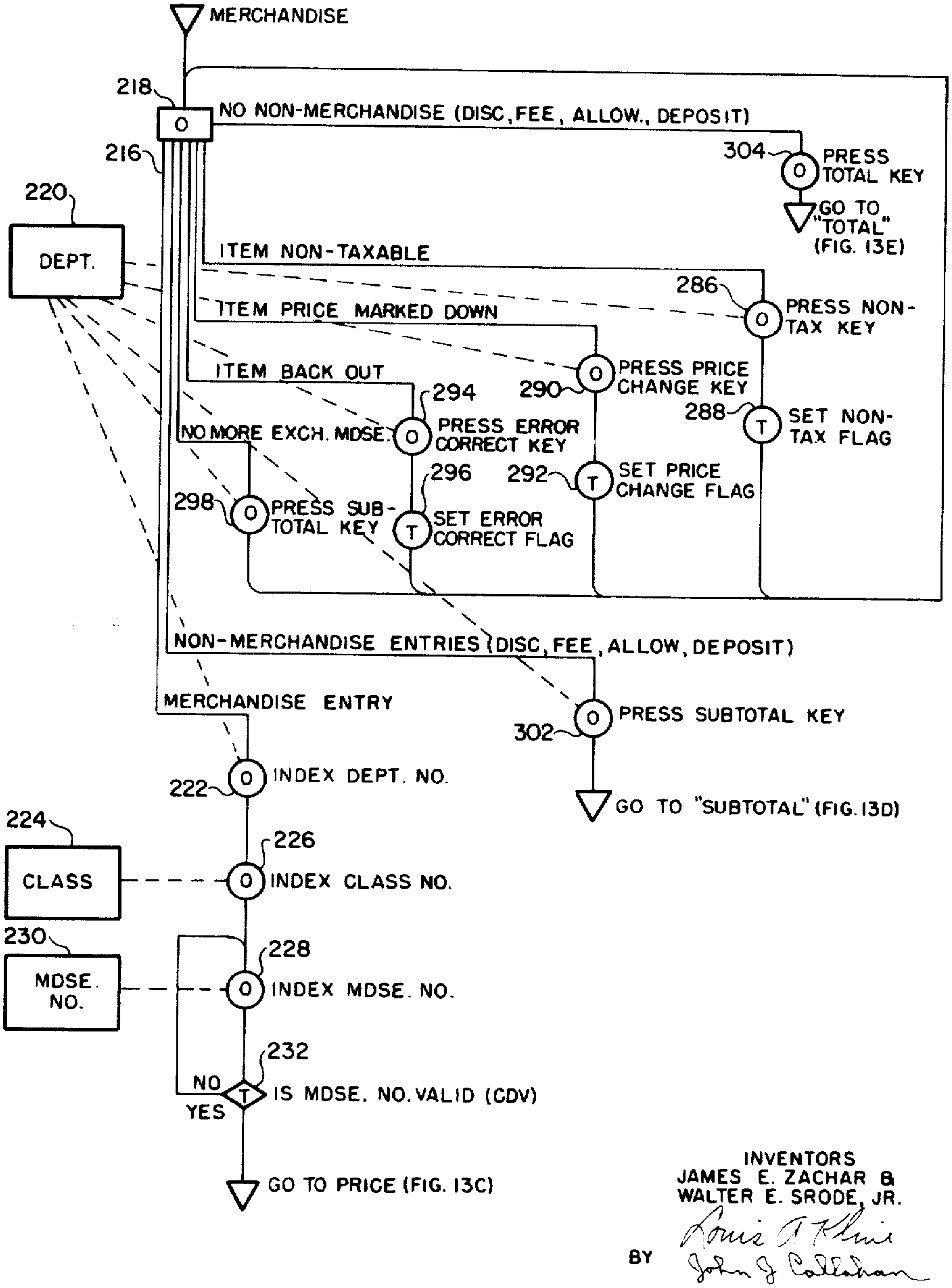

Referring now to FIG. 13B, the merchandise portion of the transaction will now be described. Beginning at the point labeled "Merchandise," the next symbol, 218, indicates that the operator will then have to make a choice of at least one of (1) whether a merchandise entry is to be made; (2) whether or not a non-merchandise (fee, discount, allowance, or deposit) entry is to be made; (3) whether or not more exchange merchandise is present; (4) whether any items should be backed out of the terminal; (5) whether there is a price change on the item of merchandise which is to be entered; or (6) whether the item of merchandise which is to be entered is non-taxable.

In the normal cash or charge sale, after the operator has entered his identification number, there will be one or more articles of merchandise to be entered. Assuming that the keyboard 18 is used to enter the information, and following the line 216 from the decision 218, the first item of information which must be entered is the department number associated with the first article of merchandise. This will be indicated to the operator by the lighting of the message DEPT. on the operator display 18, indicating that the department number should be entered, as shown by the box 220 in FIG. 13B.

Prior to entering the department number, the operator would have had to make the decision of whether or not the article to be entered is subject to a state sales tax. If it is, the operator need do nothing; however, if it is not, the operator must press the NON TAX key 54 of the keyboard 18.

After the operator has entered the department number, the message class appears on the operator display 218, as indicated by the box 224. The symbol 226 indicates that the operator must then enter the class number associated with the first article of merchandise. The symbol 228 indicates that the operator must then enter the merchandise number of the first article of merchandise in response to the message MDSE. NO. appearing on the operator display 18, as indicated by the box 230. Thereafter, the terminal will determine whether the merchandise number is valid by performing a check digit verification on the merchandise number, as indicated by the symbol 232. At this point, all of the inventory control information associated with the particular article of merchandise will have been entered into the terminal. The only remaining thing associated with this particular article of merchandise is the price.

Figure 13C:
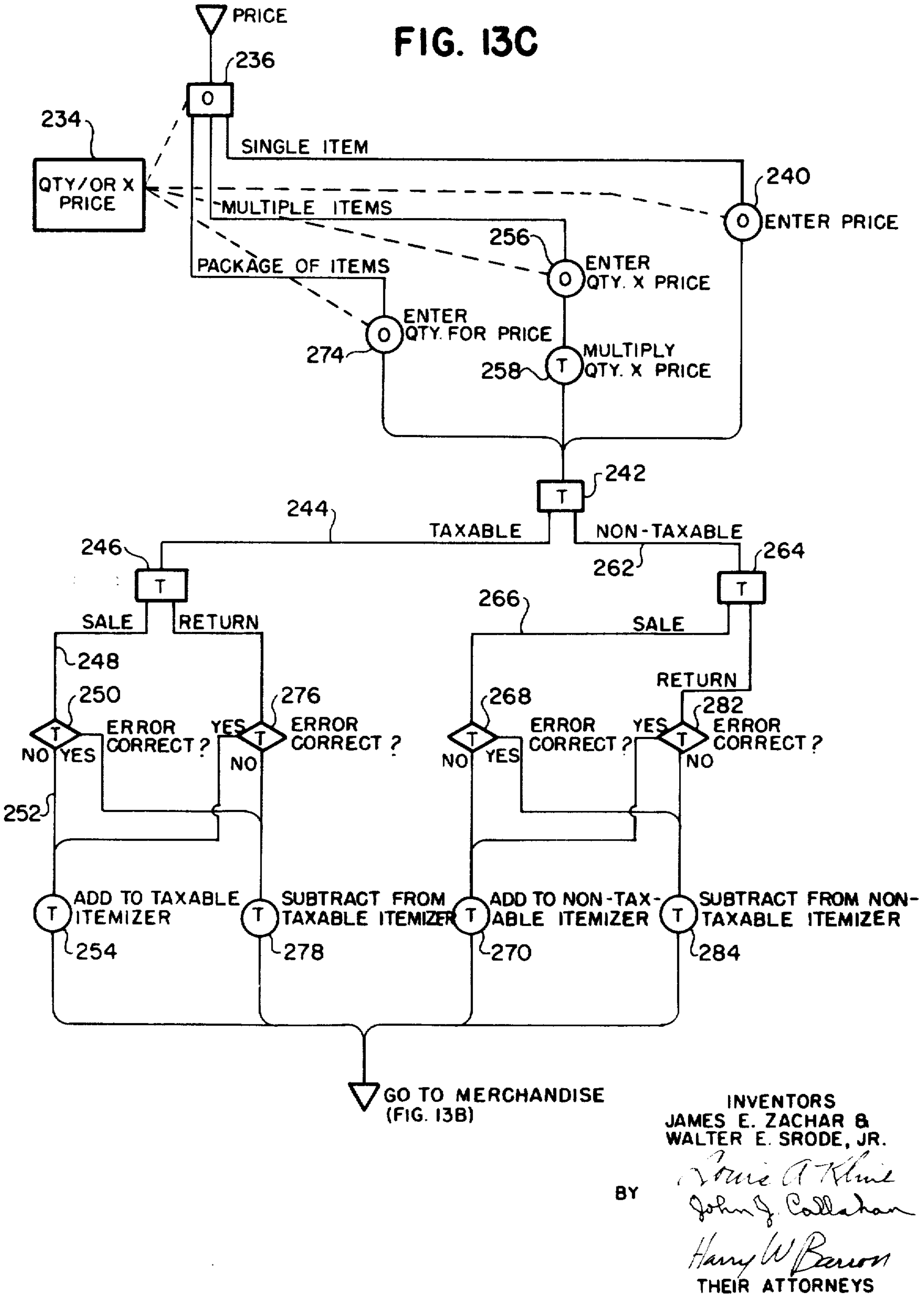

For the sequence of entering the price, reference is made to FIG. 13C at the point labeled PRICE. When the piece information is to be entered, the operator display 18 will display the message QTY/OR X PRICE, as indicated by the box 234. The symbol 236 indicates that the operator responds to this message by making the decision whether the article being entered is a single item, multiple items, or a package of items. If the item is a single item, then the operator will enter merely the price of the item as indicated by the symbol 240. TCU 12, in response to the lack of an X (times) signal character being sent thereto from the keyboard 16, will know that there is only one of the article and will process only the price of that article.

Following the entry of the price of the article, the terminal must decide, as indicated at the symbol 242, whether the article is a taxable item or a non-taxable item; that is, whether or not the NON TAX key 54 had been pressed before the department number was entered. Assuming for the present that the terminal determines that the article is taxable, then, following the line 244 to the symbol 246, it is seen that the terminal again must make the choice of whether the transaction is a sale of merchandise or a return of merchandise. This decision is determined by looking at the qualification code which was entered at the very beginning of the transaction. Assuming that the transaction is a sale, and following the line 248 to the symbol 250, it is seen that the next thing which the terminal must do is make the decision of whether or not the ERROR CORRECT key 48 had been pressed prior to entry of the department number at the symbol 222 in FIG. 13B. Assuming that the ERROR CORRECT key 48 has not been pressed, then, following the line 252 to the symbol 254, the terminal will then add the amount entered at the symbol 240 to the taxable itemizer, which may be one of the registers in TCU 12 or a series of storage locations in the read/write memory 24. Thereafter, the flow diagram indicates that a return to the merchandise point in FIG. 13B is indicated.

Referring now to the symbol 236 in FIG. 13C, and assuming that multiple articles had been involved in the transaction, the operator would have to have pressed numerical keys of the keyboard 18 corresponding to the quantity, the X function key 58, and numerical keys relating to the price of a single one of the articles, followed by the ENTER function key 40. Thereafter, as indicated by the symbol 258, the terminal will multiply the quantity times the price.

Thereafter, the flow diagram continues at the symbol 242. Now, assuming that the articles of the multiple articles entry were non-taxable (that is, that the NON TAX key 54 had been pressed prior to entry of the department number), the flow diagram follows the line 262 to the symbol 264. The symbol 264 indicates that the terminal must make the choice again of whether it is a sale or a return of merchandise. Again assuming the sale of an article, and following the line 266 to the symbol 268, the terminal must determine whether the ERROR CORRECT key 48 had been depressed. Assuming that this is not the case, the symbol 270 indicates that the terminal would add to the non-taxable itemizer the amount of the quantity times the price entered at the symbol 256. A return to the merchandise sequence in FIG. 13B is then indicated.

Referring back again to the symbol 236, if several articles had been purchased for a fixed amount (for example, three for a dollar), the symbol 224 indicates that the operator would enter the quantity, the /FOR key 56, and the price. Thereafter, the flow diagram continues at the symbol 242, which indicates that the terminal must decide whether the items are taxable or non-taxable, and, for either choice, the next terminal decision is whether the transaction is a sale or a return of merchandise, as indicated at the symbols 246 or 264.

Now assume that the transaction had been a taxable return of merchandise. The flow diagram continues at the symbol 276, where the terminal must determine whether the ERROR CORRECT key 48 had been pressed. If it is still assumed that it has not, then the terminal causes the amount indicated by the price of the exchanged article to be subtracted from the taxable itemizer, as indicated by the symbol 278. Thereafter a return to the merchandise sequence in FIG. 13B is indicated.

If the transaction had been a non-taxable return of merchandise, the flow diagram goes from the symbol 242 to the symbol 264 and thereafter to the symbol 282, which indicates that the terminal must decide whether the ERROR CORRECT key 48 had been pressed. Assuming that it had not, the terminal subtracts the amount of the returned article from the non-taxable itemizer, as indicated at the symbol 284. Thereafter, a return to the merchandise sequence in FIG. 13B is indicated.

The symbols 250, 276, 268, and 282 all indicate that the terminal must determine whether the ERROR CORRECT key 48 had been pressed. Previously, it had been assumed that this key had not been pressed. However, if, at the symbol 218 in FIG. 13B, the operator had determined that a previously entered article should now be backed out of the terminal because, for instance, the customer has changed his mind about purchasing a particular article, or that a mistake had been made, the operator would press the ERROR CORRECT key 48 prior to entering the department number. This is shown by the symbol 298 in FIG. 13B. It is seen that the opposite of the previously-explained addition or subtraction from either the taxable itemizer or the non-taxable itemizer occurs at the symbols 250, 276, 268, or 282 if the ERROR CORRECT key 48 had been depressed. For instance, referring to the symbol 250, it is seen that, if the ERROR CORRECT key 48 had been pressed, then the amount of the merchandise involved would be subtracted from the taxable itemizer. Similarly, at the symbol 276, if the ERROR CORRECT key 48 had been pressed, the amount of the item involved in the transaction would be added to the taxable itemizer. The same negative events occur at the symbols 268 and 282.

After the prices of the item or items involved in the transaction have been entered and the terminal operates on them as explained in connection with FIG. 13C, a return to the merchandise sequence of the operation is indicated. Therefore, referring again to FIG. 13B and to the point labeled "Merchandise," it is necessary that the operator again make the decisions indicated at the symbol 218. If there are more articles of merchandise to be entered in the terminal, then the sequence of operation just described is repeated. This continues until there are no longer any merchandise articles to be entered. Thereafter the operator will have to make the choice of which is the next sequence of operations to be performed.

Another decision which the operator must make at the symbol 218 in FIG. 13B is whether the price of the article had been marked down. This decision is necessary only where the tag reader 14 is being used to enter the department number, the class number, the merchandise number, and the quantity and price of the article of merchandise. If the price of the item had been marked down and the coded tag had not been changed to indicate this, the operator will press the PRICE CHG. key 52, as indicated by the symbol 290.

The cases where the operator presses the NON-TAX key 54, the PRICE CHG. key 52, or the ERROR CORRECT key 48, a certain bit stored in the indicator register 142 could be changed to a logical "1" from its normal logical "O." This acts to set up a flag signal which the TCU 12 program can check whenever a decision depends upon whether one of those keys had been pressed. The symbols 288, 292, and 296 indicate the setting of these flags for the NON TAX key 54, the PRICE CHG. key 52, and the ERROR CORRECT key 48, respectively.

If the original qualification had been designated as an exchange of merchandise operation, then the operator, after all the exchanged merchandise had been entered, would press the SUBTOTAL key 44, as indicated by the symbol 298. This would conclude the exchange process of the operation, and thereafter the merchandise entries will be made and treated as sales entries in the manner previously indicated.

Referring back again to the symbol 218, once all the merchandise has been entered into the terminal, the operator will have to make a choice as to whether or not any merchandise entries are to be made, such as a discount, a fee, an allowance, or a deposit. If there are some non-merchandise items, the symbol 302 indicates that the operator must press the SUBTOTAL key 44. Thereafter, the flow diagram will continue with the subtotal sequence of the transaction in FIG. 13D. If the operator had determined that there are no non-merchandise entries to be made, he would have pressed the TOTAL-END TRANS. key 46, as indicated at the symbol 304, and this would have caused the transaction to skip the sub-total sequence and go to the total sequence shown in FIG. 13E.

Figure 13D:
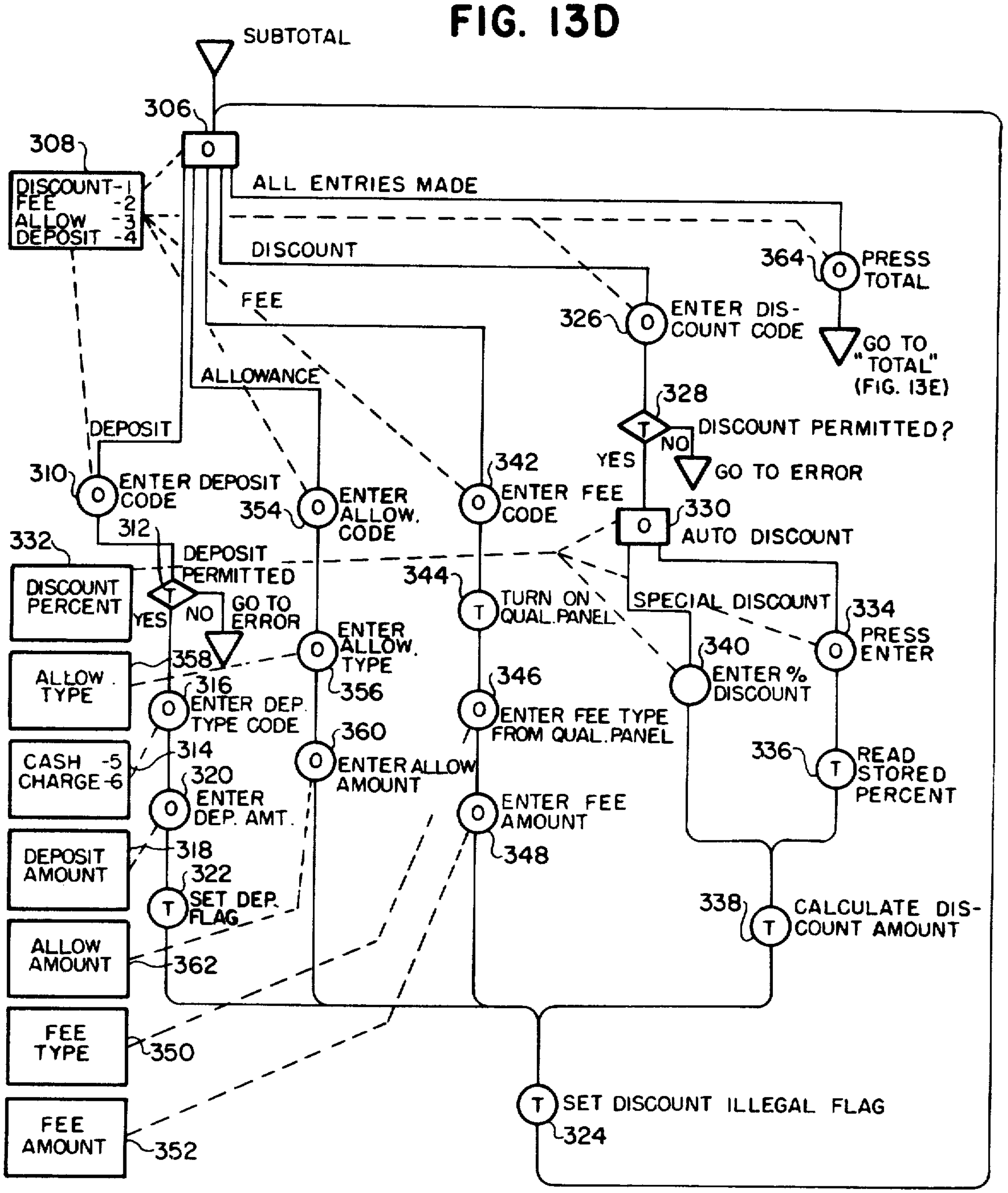

Now, referring to FIG. 13D at the point marked subtotal, the symbol 306 indicates that the operator will have to make the decision at this point as to whether the non-merchandise entries are discount, fee, allowance, or deposit, or whether there are no more non-merchandise entries to be made. At this point, the operator display 18 will be displaying four messages, DISCOUNT–1, FEE–2, ALLOW.–3, and DEPOSIT–4, as indicated by the box 308. To begin the sequence to enter one of these non-merchandise items, the operator will press one of the numeric keys 1, 2, 3, or 4, followed by the ENTER key 40. If a discount is to be given to the customer, this non-merchandise entry must be made first. The remaining non-merchandise entries, if any, can then be made in any order and more than once.

Assuming that a discount is to be given in this transaction, the operator would have to depress numeric 1 key followed by the ENTER key 40 to indicate to the terminal that a discount is to be processed, as shown at the symbol 326. The terminal then, as indicated at the symbol 328, will determine whether the discount is permitted or not. If not, the error light and tone will occur. Assuming that a discount is permitted, the symbol 330 indicates that the operator will have to make the decision whether the percent of the discount is special, or whether it is the automatic discount percent which is stored in the terminal. At this time, the PERCENT message will be being displayed on the operator display 18, and the operator will know from this message that he must make the decision.

If the automatic discount sequence is used, then the operator merely would press the ENTER key 40 to indicate that the discount is to be the stored amount, as indicated at the symbol 334. The terminal will then read the stored discount percent, as indicated at the symbol 336, and calculate the discount amount, as indicated at the symbol 338. If the special discount sequence is to be used, the operator will enter one or two numbers, followed by the ENTER key 40, and the terminal will then calculate the amount of discount, as indicated at the symbol 338. Thereafter, the terminal will set the discount illegal flag, as indicated by the symbol 324, and return to the symbol 306.

After the discount sequence is finished, the operator is then free to select the fee, allowance, or deposit sequences. When the fee sequence is selected, the operator, as indicated at the symbol 342, then enters the fee code which he reads from the message on the operator display 18 and which is the numeric key 2, followed by the ENTER key 40. Thereafter, the terminal will turn on the qualification panel, as indicated at symbol 344, and the operator will see on the qualification panel the types of fees which are available. From this, as indicated by symbol 346, he would enter the numeric digit indicating the type of the fee which he is entering, and thereafter he would enter the amount of fee as indicated at symbol 348.

At the time the operator was entering the fee type at symbol 346, only the FEE 2 and the TYPE messages were being displayed, as indicated by the box 350. When the fee amount was being entered at symbol 348, only the FEE 2 message and the AMOUNT message were being displayed, as indicated by the box 352. After the fee sequence, the discount illegal flag is set, as indicated by symbol 324, and a return to symbol 306 results.

The third type of non-merchandise transaction is the allowance. In this case, the operator depresses the number 3 key, followed by the ENTER key 40, to indicate that the allowance sequence is to occur, as indicated by symbol 354. Thereafter, the operator enters the allowance type in response to the messages ALLOWANCE 3 and TYPE, as indicated by the box 358. Thereafter, the allowance amount, as indicated by symbol 360, is entered in response to the messages ALLOWANCE 3 and AMOUNT, as indicated by the box 362. Finally, the discount illegal flag is set by the terminal, as indicated by symbol 324, and a return to symbol 306 occurs.

The final type of non-merchandise transaction which can be made is for a deposit. In this case, symbol 310 indicates that the deposit code be entered by pressing the numerical key 4 followed by the ENTER key 40. After this, symbol 312 indicates that the terminal must determine whether a deposit is permitted for this type of transaction (for example, a cash sale has no deposit, whereas a lay-away sale does). If no deposit is permitted, the error light and tone come on. Assuming that a deposit is permitted, symbol 316 indicates that the operator must enter a code for the type of deposit in response to the operator display 18 message CASH 5, CHARGE 6, as indicated by the box 314. Symbol 320 then indicates that the operator must then enter the amount of the deposit, and symbol 322 indicates that the terminal then sets a deposit flag, which is used in the close-out sequence, to be described hereinafter.

It should be noted that, for instance, in the case of the fee sequence, there could be several types of fees entered, and, in the case of the allowance, conceivably there could be more than one different type of an allowance to be made. There can be only one deposit and one discount for each transaction.

Figure 13E:
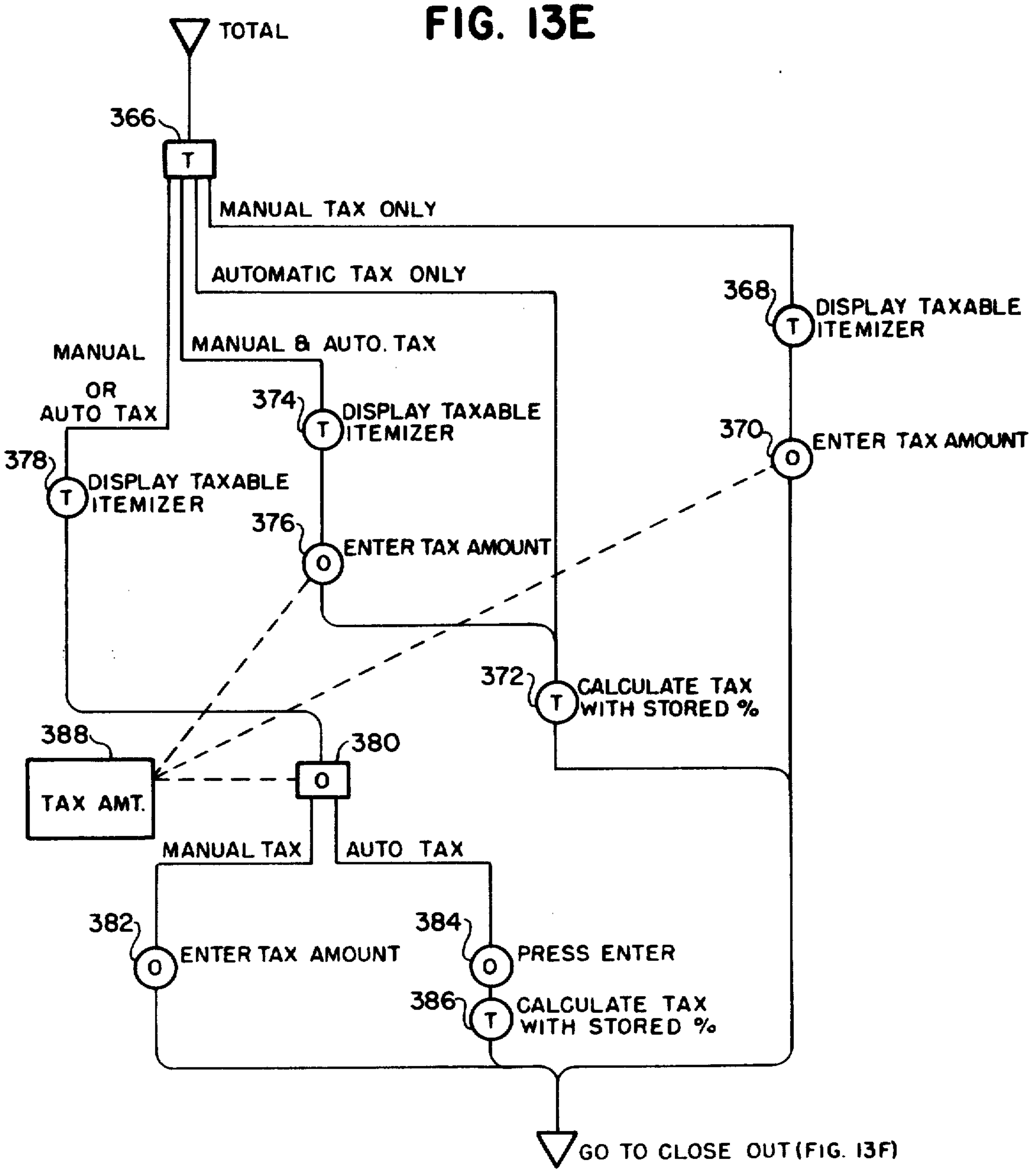

Once all of the non-merchandise entries have been made, the operator will then press the TOTAL-END TRANS. key 46, as indicated at symbol 364. This requires that the total sequence of the transaction now be entered, which is shown in FIG. 13E and to which reference will now be made.

Symbol 366 indicates that the terminal must make a decision as to which of four tax sequences are to be used. These four tax sequences include the manual tax only, the automatic tax only, the manual and automatic tax, or the manual or automatic tax sequence.

In the case of the manual tax only option, the total stored in the taxable itemizer will be displayed on both operator display 18 and customer display 20, as indicated by symbol 368. The amount stored in the taxable itemizer will be the amount subject to the sales tax. Thereafter, as indicated by symbol 370, the operator will enter the amount of the tax required on the amount displayed. After that, the close-out routine shown in FIG. 13F will be entered.

If the automatic tax only option had been selected by the terminal at symbol 366, the terminal itself would calculate the tax with the percent and the tax table stored in the read/write memory 24, as indicated by symbol 372, and the close-out routine would be entered.

If the manual and automatic tax option had been selected at symbol 366, the terminal would display the amount stored in the taxable itemizer, as indicated by symbol 374, and the operator, as indicated at symbol 376, would enter one of two taxes (for example, city and state sales taxes, which have different break points) due on this amount. Thereafter, as indicated at symbol 372, the terminal would calculate the other of the two taxes due on the taxable amount of the purchase from the stored percent and break table in the read/write memory 24. Thereafter, the close-out routine would be entered.

Finally, if the manual or auto tax option had been selected by the terminal at symbol 366, the operator display 18 would display the entire amount stored in the taxable itemizer, as indicated at symbol 378. In this case, symbol 380 indicates that the operator must make the decision of whether he wished to enter the tax himself or whether he wished to have the terminal calculate the tax automatically. If the operator decided to enter the taxable amount himself, then he would enter the amount, as indicated, by symbol 382. On the other hand, the operator, if he had desired to have the terminal calculate the tax, would merely press the ENTER key 40 without any preceding numeric keys, as indicated by symbol 384. At this point, as indicated at symbol 386, the terminal itself would calculate the tax due on the transaction, as previously explained. Thereafter, the close-out routine would be entered.

It should be noted that, during the entire time of the total sequence, if one of the manual-type tax calculation options is available, the TAX AMT message would be displayed on the operator display 18, as indicated by the box 388.

Figure 13F:
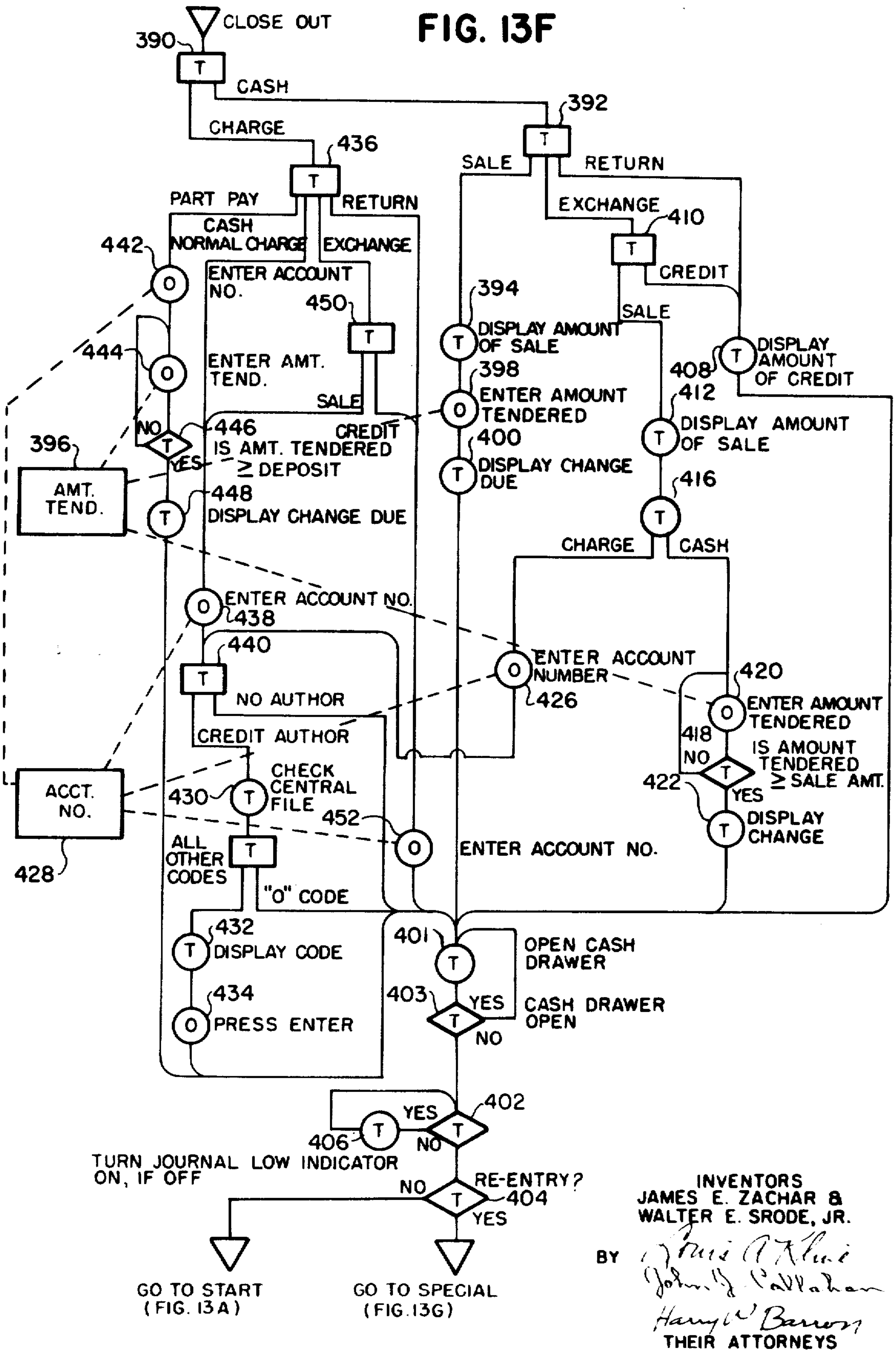

Referring now to FIG. 13F, the close-out sequence of the transaction will now be described. Referring to symbol 390, the terminal must determine whether the transaction is a cash transaction or a charge transaction. Assuming first that the terminal decides that the transaction is a cash transaction, it must next decide whether it is a sale, a return, or an exchange of merchandise transaction, as indicated by symbol 392. At both symbol 390 and symbol 392, the terminal will make these determinations by looking at the qualification code originally entered at the beginning of the transaction. If the transaction is a cash sale, then, referring to symbol 394, the terminal will display the amount of the sale on the operator display 18. At this point, the AMT. TEND. message will appear on the message portion of the operator display 18, as indicated by the box 396, and the customer will then tender to the operator a certain amount of cash. The operator will then enter the amount tendered into the terminal, as indicated by symbol 398. The terminal will then subtract the amount of the sale from the amount tendered, determine that it is greater than or equal to the amount of the sale, and display the change due to the operator, as indicated by symbol 400. If the amount tendered is less than the amount of the sale, the terminal will so indicate by leaving the amount tendered message on. Thereafter, as indicated by symbol 401, the terminal will open the cash drawer and wait until it is closed, as indicated by the symbol 403, and then determine whether or not the journal is low, as indicated by symbol 402. Assuming that the journal is not low, the terminal will decide, as indicated by symbol 404, whether this is a re-entry transaction. This determination of the re-entry will be made from the qualification initially entered. Assuming that it is not a re-entry sequence, then a return to the start point in FIG. 13A is indicated, and the transaction is over.

Referring again to symbol 402, if the terminal had decided that the journal was low, it would have turned on the JOURNAL LOW message on the operator display 18, as indicated by symbol 406. This would warn the operator of the terminal that the journal was low and it was necessary to change the journal tape.

Referring again to symbol 392, if the terminal had decided that this was a cash return transaction, then the terminal would cause the amount of credit due to the customer to be displayed on the operator display 18, as indicated by symbol 408. Thereafter, the cash drawer would be opened, and a wait period would occur until it is closed (symbols 401 and 403). The journal would be tested at symbol 402 and the re-entry test performed at symbol 404.

The last option which is available at symbol 392 is for the terminal to determine whether that is an exchange of merchandise transaction. If this is determined, symbol 410 indicates that the terminal must then decide whether this is a credit exchange or a sale exchange. If it is a credit exchange, then the terminal would cause the amount of credit due to the customer to be displayed, as indicated by symbol 408, and thereafter the cash drawer would be opened, and the journal and re-entry would be tested at symbols 401, 402, 403, and 404.

If it had been a sale exchange, then the terminal would cause the amount of the sale to be displayed, as indicated at symbol 412. Thereafter, as indicated by symbol 416, the terminal would have to decide whether the sale was to be a cash sale or a charge sale, responsive to the original qualification code. If it is to be a cash sale exchange, the customer will tender to the operator a certain amount of money to pay for the merchandise purchased less the merchandise exchanged. The operator will then enter the amount tendered into the terminal, as indicated by symbol 420, and the terminal will then test to see whether the amount tendered is sufficient, as indicated by symbol 418. Then the terminal will display the change due, as indicated by symbol 422. Thereafter, the cash drawer will be opened, a wait for closing will occur, and the journal and re-entry tests will be performed at symbols 401, 403, 402, and 404, respectively.

Referring again to symbol 416, if a charge sale had been chosen by the terminal, the operator would enter the account number of the customer, as indicated by symbol 426, in response to the ACCT. NO. message. After the customer's account number is entered at symbol 426, the terminal will check to see whether credit authorization is part of the system, as indicated by symbol 440, and, if so, will check with a central file to see whether this account number is a good credit risk, as indicated by symbol 430. If it is a good account (that is, one with a "0" code indicating that the store wishes to continue giving credit to this customer), the terminal tests for journal low and re-entry at symbols 402 and 404. If the customer is not a good credit risk, symbol 432 indicates that the terminal will cause to be displayed another code indicating what the operator is to do. The other code, for instance, may mean that the card should not be returned to the customer. If the displayed code resulting from symbol 432 indicates that the sale cannot be made as a charge sale, the operator will keep the customer's credit card, if this is indicated by the code, and thereafter press the ENTER key 40, as indicated by symbol 434. Thereafter, the terminal tests for journal low and re-entry at symbols 402 and 404.

Referring back again to symbol 390, assume that, when the terminal looks at the qualification code, it determines that the type of transaction is a charge transaction. Thereafter, the terminal, as indicated by symbol 436, will have to determine (1) whether the customer wishes to pay part of the amount by cash and the rest by his account, (2) whether the transaction is a normal charge, (3) whether there is an exchange of merchandise involved, or (4) whether there is a return of merchandise involved. Assuming first that the terminal at symbol 436 determines that it is a normal charge, the flow diagram indicates at symbol 438 that the operator enters the customer's account number in response to the ACCT. NO. message being on, as indicated by the box 428. Thereafter, as indicated at symbol 440, the terminal makes a determination of whether or not it should check for a credit authorization for the account number. If it determines that it is not necessary to authorize the account number, the cash drawer opens, a wait for closing occurs at symbols 401 and 403, and the tests for journal low and re-entry at symbols 402 and 404 are made. If, at symbol 440, the terminal determines that a credit authorization should be made, then the flow diagram continues at symbol 430, as explained above.

Returning again to symbol 436, if the terminal determines that part of the payment is to be made by cash and the remainder is to be charged, then symbol 442 indicates that the operator, in response to the ACCT. NO. message being displayed, is to enter the account number of the customer. Thereafter, the amount tendered is entered by the operator, as indicated at symbol 444. Symbol 446 indicates that the terminal determines whether or not the amount tendered is at least as good as the previously-entered deposit amount at symbol 320 in FIG. 13D. If at symbol 446 the terminal determines that the amount tendered is not at least equal to the amount entered as the deposit amount at symbol 320, the terminal will inform the operator of this fact by maintaining "on" the AMT. TEND. message 396, as indicated by the return line to symbol 444. If the amount tendered is equal to or greater than the amount of the deposit previously entered, then the symbol 448 indicates that the amount of change due, if any, be displayed on the operator display 18 and the customer display 20; the cash drawer is opened; a wait for closing occurs; and thereafter the journal low and re-entry tests are made, at symbols 401, 403, 402, and 404, respectively.

Referring again to symbol 436, if the terminal determines that the transaction involves an exchange of merchandise, symbol 450 indicates that it is necessary to make the determination as to whether this was a sale or a credit exchange. If the terminal determines that it is a sale exchange of merchandise, then the customer's account number is entered, as indicated by symbol 438, and the credit authorization procedure previously described with respect to symbol 440 is followed. If, at symbol 450, the terminal determined that there was a credit due the customer in the exchange of merchandise, then the operator is required to enter the account number of the customer, as indicated by symbol 452, in response to the ACCT. NO. message 428 being displayed. Thereafter, the cash drawer opens, a wait occurs, and the journal low and re-entry tests are performed at symbols 401, 403, 402, and 404, respectively.

Again referring to symbol 436, if the terminal determines that a return of merchandise is indicated, the ACCT. NO. message is displayed, and the account number is entered, as indicated by symbol 452. Thereafter, the cash drawer opens, a wait for closing then occurs, and the tests for journal low and re-entry are made, as indicated by symbols 401, 403, 402, and 404, respectively.

Referring now to symbol 404 in FIG. 13F, it is seen at this point that the terminal necessarily had to make a decision of whether the sequence was a normal transaction or a re-entry transaction. If the transaction is not a re-entry transaction, a return to start is indicated. At this point, the transaction is over, and a new one can begin.

Figure 13G:
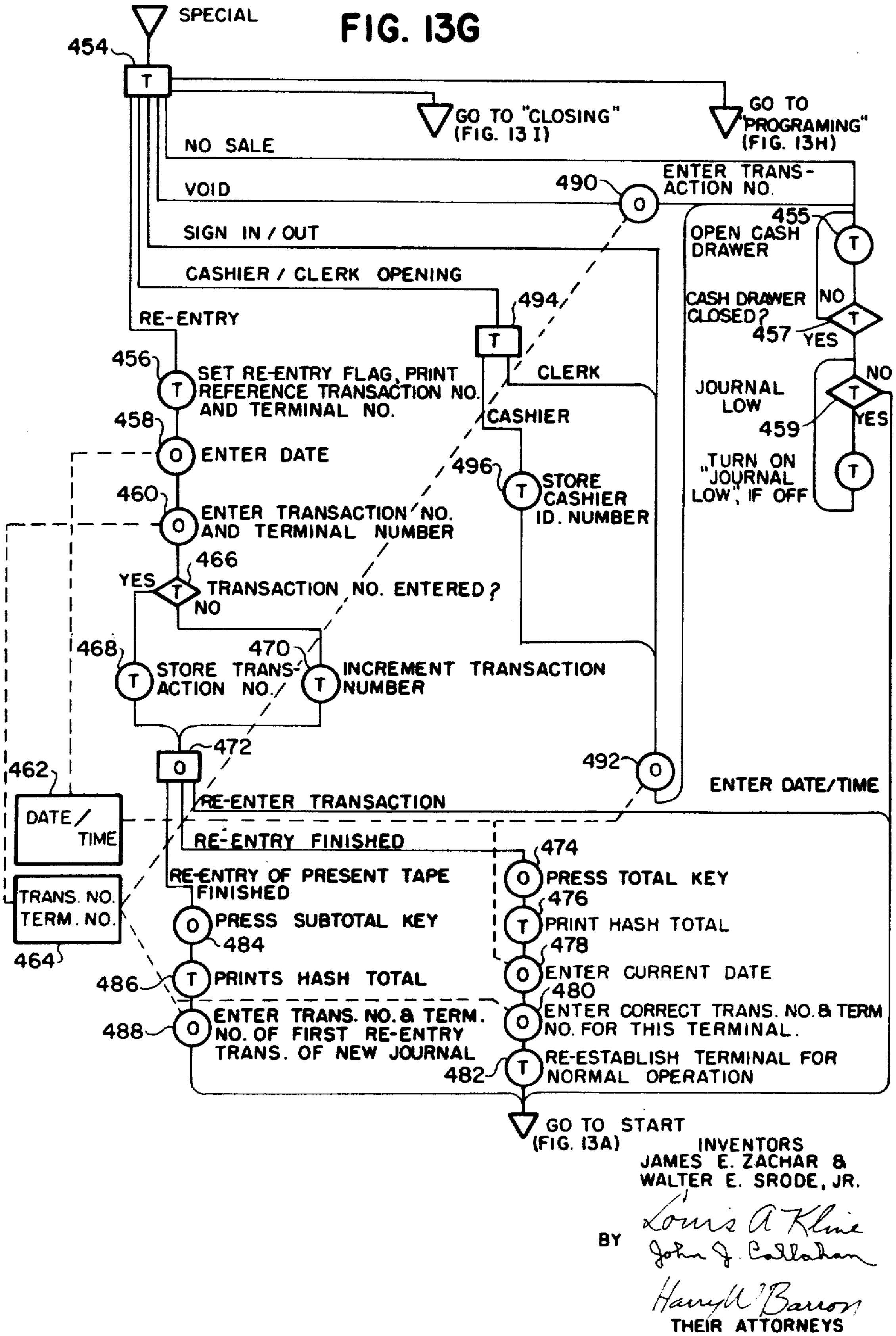

However, had the terminal decided that this was a re-entry transaction at symbol 404, the flow diagram continues in the "special" sequence of operation, which is shown in FIG. 13G.

Figure 13H:
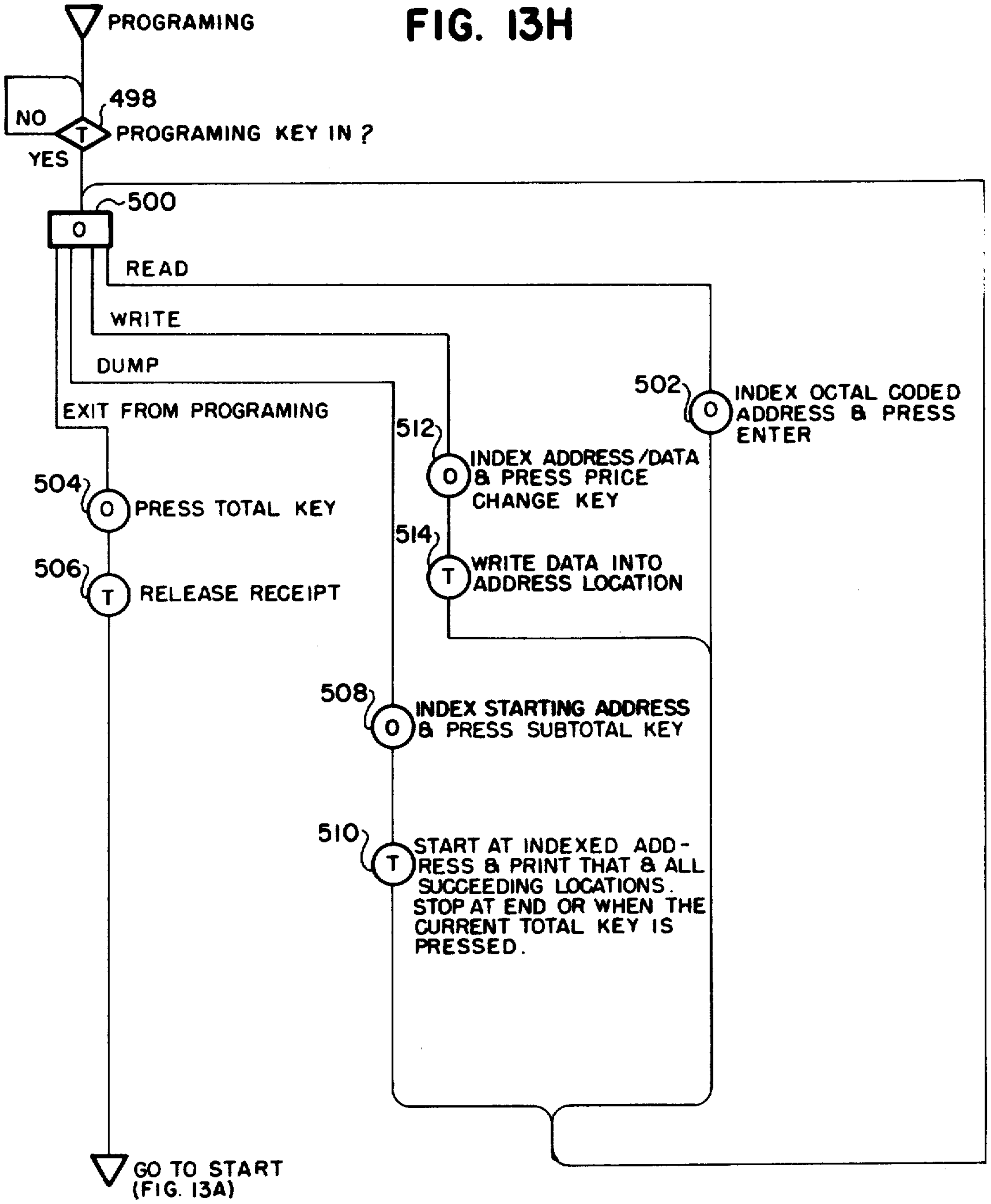
Figure 13I:
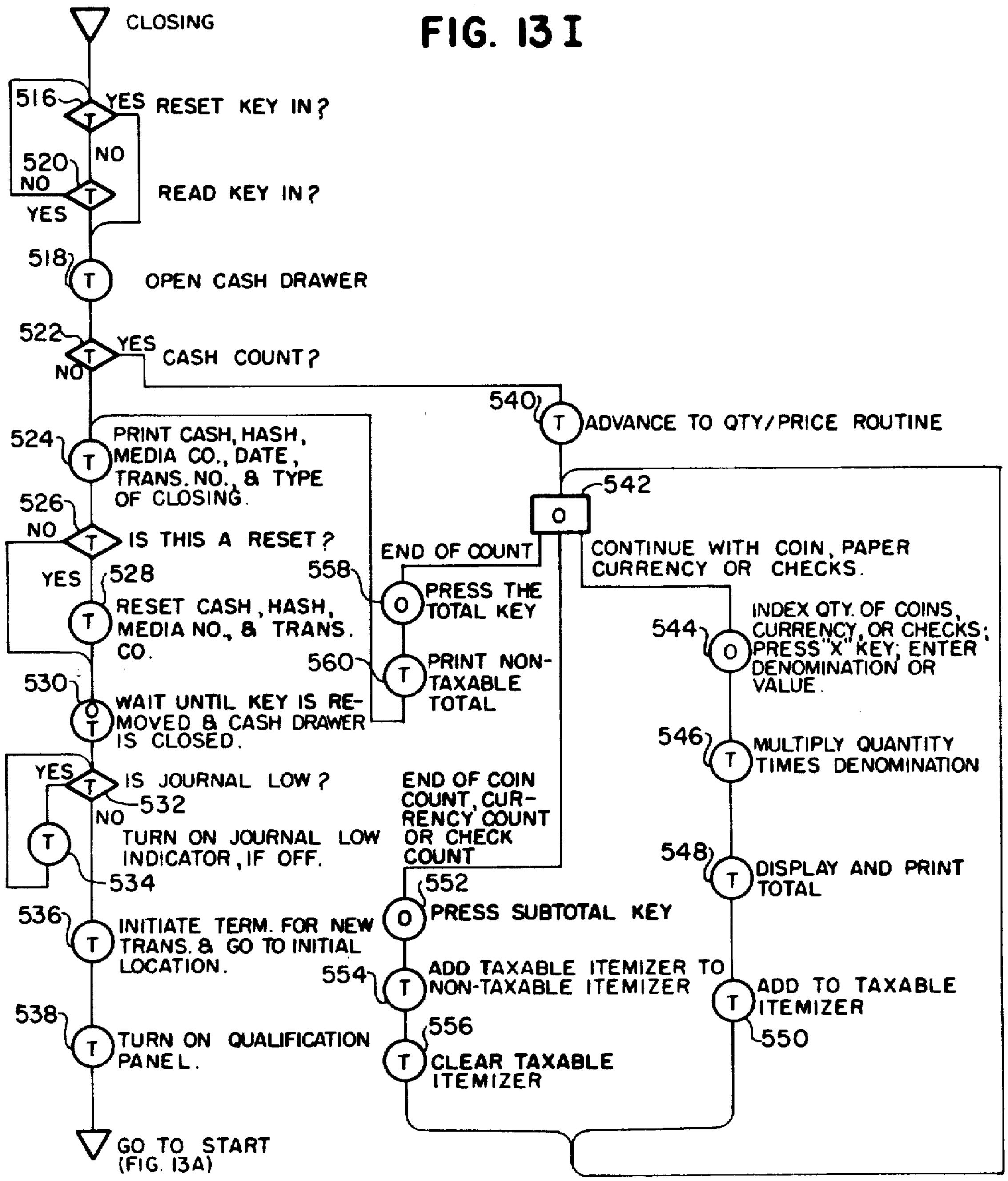

Referring again to symbol 214 in FIG. 13A, it was previously assumed that the terminal made the assumption that a normal merchandise entry transaction was occuring, and this was described in FIGS. 13B through 13F. However, the terminal could have determined that a special transaction, which is shown in FIGS. 13G, 13H, and 13I, is necessary, and this would be done for certain of the qualification numbers which were entered at symbol 200.

Therefore, referring to symbol 454 in FIG. 13G, it is indicated that the terminal must make the choice of which kind of special transaction is occurring. These choices include (1) programming, (2) closing, (3) no sale, (4) void, (5) sign in/out, (6) cashier/clerk opening, and (7) re-entry. Where the programming choice is made, reference is made to FIG. 13H, and where the closing choice is made, reference is made to FIG. 13I.

Assuming that a "no sale" had been selected at symbol 454, symbol 455 indicates that the terminal merely causes the cash drawer to be opened, and symbol 457 indicates that a wait period occurs until it is closed. Thereafter, a journal low test is performed, as indicated by symbol 457. If the journal is low, the JOURNAL LOW message is turned on, as indicated by symbol 459. Nothing else will occur until the journal tape is replaced. If the journal is not low, a return to start in FIG. 13A is indicated, thereby including the "no sale" transaction.

If a void had been selected at symbol 454, then the operator, as indicated at symbol 490, would have to enter the transaction number, which could be read from the journal. Thereafter, the cash drawer is opened, the journal low is checked, a return to start in FIG. 13A is indicated, and the void transaction is complete. Note that the entire transaction does not have to be repeated.

If, at symbol 454, the terminal determined that a sign-in transaction was occurring, the operator signing in or signing out would be required to enter the date and the time in response to the DATE/TIME message appearing in the operator display 18, as indicated by the box 462. Thereafter, the cash drawer is opened, the journal is checked, a return to start in FIG. 13A is indicated, and the sign in/sign out transaction is concluded. This transaction can be used in place of a time clock.

Another choice which the terminal can make at symbol 454 is the cashier or a clerk opening. Where this choice is made, the terminal must thereafter make the choice indicated at symbol 494 of whether a clerk or cashier opening is being made. If the terminal determines that it is a clerk opening made, then symbol 492 indicates that the time and the date are entered in response to the message DATE/TIME, and the cash drawer is opened, the journal is checked, and a return to start is indicated, thereby concluding the clerk opening transaction. However, if, at symbol 494, the terminal determined that a cashier opening was occurring, then, as indicated at symbol 496, the terminal would store the cashier's I. D. number, which was previously entered at symbol 210 in FIG. 13A. Thereafter, symbol 492 indicates that the date and the time are entered, the cash drawer is opened, the journal low is checked, and a return to start is indicated, thereby concluding the cashier opening transaction.

Another transaction which can be chosen at symbol 454 is the re-entry transaction. Before considering this transaction, its reason for being should be understood. As previously indicated, the terminal C–280 normally transmits the processed data to the data collector 10, in a real-time, on-line manner. However, occasionally an equipment breakdown may occur, with the result that the terminal C–280 is not communicating with the data collector 10; that is, it has gone off-line. The re-entry procedure is provided to allow the terminal to remain operative to transact normal business between the customer and the store. In the off-line event, a special code, such as 1111112NT111111, is printed on the journal after each transaction affected by the off-line condition. These transactions may occur in groups or intermittently.

When the terminal is off-line, the printer 26 prints on the journal the hash total (total of checks, currency, and coins since the last closing transaction) at the end of each off-line transaction. This information can be used during re-entry to insure against mistakes.

The re-entry transaction begins with the proper qualification code and identification number, if necessary, of the operator. In response to the re-entry qualification code, symbol 454 chooses the re-entry transaction, and symbol 456 indicates that the terminal sets the re-entry flag and prints the reference transaction and terminal numbers on the journal. The re-entry flag causes the terminal to additionally print the current date and identification number on the journal; to lock out the × key 58 of the keyboard 14; to lock out the slip enforcement requirement where charge transactions occur; to print on the journal only; to add to the hash totals only; to inhibit the cash drawer and coin dispenser operation; and to inhibit access to credit authorization file.

Thereafter, as indicated by symbols 458 and 460, the date, the transaction number, and the terminal number of the transaction being re-entered are entered by the operator in response to the messages DATE/TIME and TRANS. NO./TERM. NO., respectively, shown by the boxes 462 and 464. Thereafter, the terminal must decide whether a transaction number was entered, or only the ENTER key 40 was pressed, as indicated by symbol 466. If a number was entered, the terminal stores the number, as indicated by symbol 468, for later use. However, if the transaction number of the transaction being re-entered is one greater than the previous re-entered transaction, the operator need only press the ENTER key 40, and the terminal will automatically increment, by one, the previously stored transaction number, as indicated at symbol 470.

Thereafter, symbol 472 indicates that the operator must choose whether to re-enter a transaction, whether all re-entries on the present tape are finished, or whether all re-entries are finished. If he chooses to re-enter a transaction, he proceeds exactly the same as the type of transaction being re-entered except (1) on all multiple-quantity items, the /FOR key 56 is used rather than the × key 58, since the total price is shown on the journal (hence the X key 58 is locked out); and (2) the credit authorization code provided at symbol 431 in FIG. 13F is not entered. The operator repeats this for each transaction on that journal.

When all entries on a given journal have been entered, the operator will press SUBTOTAL key 44, as indicated by symbol 484. Thereafter, the terminal prints the hash total on the journal, as indicated by symbol 486, and the TRANS. NO./TERM. NO. message is turned on, as indicated by box 464. Thereafter, in accordance with symbol 408, the operator enters the transaction number and the terminal number of the first re-entry transaction on the new journal. Thereafter, a return to start is indicated, and the re-entry transactions on this new journal are entered, as previously explained.

After all of the re-entry transactions have been made, the operator presses the TOTAL-END TRANS. key 46, as indicated by symbol 474. Thereafter, the terminal prints the hash total, as indicated by symbol 476, and the DATE/TIME message is turned on, as indicated in the box 462. In response to this message, the operator enters the current date, as indicated by symbol 478, and the message TRANS. NO/TERM. NO. is turned on. In response thereto, the operator enters the correct transaction and terminal number of the terminal performing the re-entry transaction, as indicated by symbol 480. Thereafter, normal operation is re-established, as indicated by symbol 482, and a return to start is indicated, thereby concluding the re-entry transaction.

At this point, the operator can check the hash totals printed on the journal during off-line operation with the hash totals printed as a result of symbols 476 and 486, to determine whether any errors were made.

The terminal at symbol 454 could also have chosen a closing transaction or a programming transaction which would additionally require one of the key locks on TIC 30 to be turned on. Assuming first that it is desired to program the terminal and the programming transaction had been chosen, reference is made to FIG. 13H and specifically to symbol 498, which indicates that the terminal will determine whether the programming key is in. If it is not, nothing will happen. Assuming that it is in, then symbol 500 indicates that the operator will press one of the function keys, depending on (1) whether he wishes to read the information stored in one location of the read/write memory 24 program; (2) whether he wishes to change the information by writing new information into one of the locations of the read/write memory 24 program; (3) whether he wishes to read the entire program stored in the read/write memory 24; or (4) whether he wishes to exit from the programming transaction.

Assuming that the operator, at symbol 500, determines that he wishes merely to read the information in only one location of the read/write memory 24 program, he would enter the octal code of that location of the read/write memory 24 from which he wished to read, followed by the ENTER key 40. At this point, the terminal would print out the information stored in the read/write memory 24 location associated with that octal code.

After symbol 502, the flow diagram indicates a return to symbol 500.

If the operator had wished to read the entire program from the read/write memory 24, or the entire program occurring after a certain location, he would have entered the octal code of the starting address and thereafter pressed the SUBTOTAL key 44, as indicated by symbol 508. Thereafter, as indicated by symbol 510, the terminal will start at the given address and read the entire read/write-memory-24-stored information and print it on the receipt. Symbol 510 also indicates that the operator can stop the reading at any time by pressing the CURRENT TOTAL key 42, or the reading will stop automatically after the last location of the read/write memory 24 is read.

Another choice which the operator has at symbol 500 is to write information into the read/write memory 24 program to change a portion thereof. As indicated at symbol 512, the operator will enter the octal code of the location into which he wishes to write information and thereafter the octal code for the data, followed by the PRICE CHG. key 52. This indicates to the terminal that the data is to be written into the address location, and the terminal causes this to occur, as indicated by symbol 514. Thereafter, a return to symbol 500 is indicated. At that point, the operator may wish to check the information which he has just written in, by entering the read sequence and going to symbol 502, as previously explained.

The final choice which the operator has at symbol 500 is to exit from the program. He does this by merely pressing the TOTAL-END TRANS. key 46, as indicated by symbol 504. Thereafter, as indicated by symbol 506, the terminal releases the receipt, so that the operator can see what was read, and a return to start is indicated, thereby concluding the programming transaction.

In FIG. 13G, at symbol 454, it is also possible that the terminal may have chosen the closing routine, and, for this, reference is made to FIG. 13I. For the closing operation, either the read key lock or the reset key lock of TIC 30 must be turned, indicating whether it is desired to have a closing with a cash count or closing without a cash count. Symbol 516 indicates that the terminal must determined whether the reset key has been turned. If the reset key is turned, a skip to symbol 518 is indicated. If the reset key is not turned, then the terminal must decide whether the read key is turned, as indicated by symbol 520. If the read key has been turned, the program will continue at symbol 518; if it has not been turned, a return to symbol 516 is indicated, and the operator must turn one of the two keys for the transaction to continue. Assuming that one of the read or reset keys has been turned, symbol 518 indicates that the terminal then opens the cash drawer, and symbol 522 indicates that the terminal must decide whether or not there is to be a cash count. This decision is made in response to the program of TCU 12.

If no cash count is desired, then the terminal will print the cash and hash totals, the media count, the date, the transaction number, and the type of closing on the journal, as indicated by symbol 524. Thereafter, the terminal will determine whether the reset key had been turned on at symbol 526. If the reset key had been turned on, the terminal then will reset the cash, hash, media number, and transaction number count of the terminals to zero, as indicated by symbol 528. If at symbol 526 the reset key had not been turned on, thereby indicating that the read key was turned on, then the transaction will continue at symbol 530. At symbol 530, a wait is indicated until the key is removed and the cash drawer has been closed. Thereafter, symbol 532 indicates that the terminal determines if the journal is low, and, if low, as indicated at symbol 534, the message indicating "journal low" is turned on. If the journal is not low, then, at symbol 536, the terminal initiates itself for a new transaction and goes back to its initial location. As indicated by symbol 538, the terminal then turns on the qualification panel, and a return to start is indicated for a new transaction, thereby ending the closing transaction.

Referring again to symbol 522, if the terminal had been programmed to require a cash count for closing, it would advance itself to the quantity price routine in the program, as indicated by symbol 540. Thereafter, the operator would have to make the choice of (1) whether it was the end of the count, (2) whether it was the end of the coin count, currency count, or check count, or (3) whether he was continuing with the coin, currency, or check count. Assuming first that at symbol 542 the operator was still counting the coins, paper currency, and/or checks, he would count the number of each denomination of the coins, the paper currency, or the checks, and then enter the amount into the terminal, as indicated by symbol 544. This may be done, for instance, by pressing 20 × 0.05 to indicate that there are twenty nickels, or 10 × 5.00 to indicate that there are 10 five-dollar bills. The terminal does the calculations as indicated by symbol 546. Thereafter, the terminal will display and print the total and add this amount to the taxable itemizer, as indicated by symbols 548 and 550. Thereafter, a return to symbol 542 is indicated, and the same procedure is repeated until all of the coins, paper currency, and checks have been entered.

Thereafter, the operator depresses the SUBTOTAL key 44, indicating that the end of the coin count, currency count, and check count portion is at hand, as indicated by symbol 552. Then the terminal adds the taxable itemizer to the non-taxable itemizer, as indicated by symbol 554, and it clears the taxable itemizer, as indicated by symbol 556, and a return to symbol 542 is indicated. The operation could continue with the currency count, check count, etc., as explained above, with the subtotal key separating each count.

At this point, the counting routine is over, and the operator indicates this by pressing the TOTAL END TRANS. key, as indicated by symbol 558. The terminal then prints the amount stored in the non-taxable itemizer, as indicated by symbol 560. Thereafter, the same procedure is followed as previously described, with the no cash count closing occurring starting with symbol 524.

It is seen from the previous description of the operation of the terminal that the terminal provides a lead-through procedure to the operator; that is, whenever a special type of routine is to occur, a special message will appear on the message portion of the operator display 18 to indicate to the operator what he must do. This is an extremely valuable aspect of the terminal operation, especially where new operators are continually being trained in the business using this system. This lead-through procedure is especially valuable for the uncommon types of transactions like opening, closing, programming, re-entry, etc.

The flow diagram just described is a general description of how the terminal operates. This exact operation is in response to the stored program and the read-only memory 100 of TCU 12. There is set out below a portion of the program, which is given for explanatory purposes only, which may be used in the qualification portion of the sequence; that is, in the portion defined by symbols 200, 202, and 204 and line 206 in FIG. 13A. It is believed that a suitable program for TCU 12 to perform the operations described herein is within the state of the art, especially in view of the example set out below.

| | OP | O | D | ROM Location | Comment |
|---|---|---|---|---|---|
| Star | SFU | CORE | READ | 031 | Read Core Char. 00 in Location 0 |
| | MOVIB | | AC | 032 | Place Core Char. 00 in Accum. |
| | BAT | O | 8 | 033 | Check for Last Display Char. |
| | | MASK | | 034 | |
| | BSR | | | 035 | Go to Subprogram STDP to |
| | | STDP | | 036 | Clear Display |
| COM 3 | SFU | CORE | AVRD | 037 | Read Core Location 01 |
| STR 2 | CIB | F | F | 038 | Clear All Indicactor Bits |
| | BSR | | | 039 | Branch to Subprogram RDP6 to |
| | | RDP6 | | 03A | read next six core char. HCl |
| | BAT | 4 | 4 | 03B | Check bit 7 of core |
| | | PUNC | | 03C | Word 01 for punctuation |
| | BUC | STR1 | | 03D | Branch +6 ROM locations |
| STAR 1 | CLR | Hold | | 044 | Clear Hold Register |
| | CLR | CNT1 | | 045 | Clear CNT1 Register |
| ERCL | BSR | | | 046 | Check to see if have a line to |
| | | CREC | | 047 | data collector |
| IFCT | BST | KEY | KERR | 048 | If Keyboard sends error status, |
| | | ERKB | | 049 | branch to ERKB; otherwise continue |
| | FTB | KEY | KIN | 04A | If keyboard has input send it; |
| | | ON | KSND | 04B | otherwise branch to ON |
| | MOVIB | | SC1 | 04C | Put keyboard data in SC1 Register and accumulator |
| | SFU | TIC | TONE | 04D | Sound tone indicating key depression |
| | LAC | 0 | 3 | 04E | Load 3 into accumulator |
| | BSR | | | 04F | Branch to "TIM2" subprogram |
| | | TIM2 | | 050 | |
| | MOVCNT1 | | AC | 051 | Move character count to accum. |
| | BAC | 0 | 0 | 052 | If this is the first character, |
| | | BYPA | | 053 | branch to BYPA |
| | BAC | 0 | E | 054 | If character count too great, |
| | | ERR | | | branch to ERR (Error) |
| | BAT | 0 | 0 | 056 | Branch to INPT |
| | | INPT | | 057 | |
| BYPA | SFU | DISP | DCLD | 0A4 | Clear numerics only |
| | MOVIND1 | | AC | 0A5 | Move MSC of IND1 register to accumulator |
| | BAT | 2 | 0 | 0A6 | Branch to COLF if bit 6 is " 1" |
| | | COLF | | | |
| | LAC | 7 | 6 | 0A8 | Put 01110110 into accumulator |

| | | | | | |
|---|---|---|---|---|---|
| | BSR | | | 0A9 | Branch to STDP to clear display TOTAL message |
| | STDP | | | 0AA | |
| COLF | IND2 | AC | | 0AB | Move MSC of IND2 register to accumulator |
| | BAT | 8 | 0 | 0AC | If bit 8 is "1", branch to PDIA |
| | PDIA | | | OAD | |
| BPDG | BSR | | | OAE | Check printer clear bit; clear printer buffer; send column address of 0 to printer |
| | CPCB | | | OAF | |
| | BIT | 1 | 0 | OBO | If punctuation is necessary, use customer display |
| | DFRD | | | OB1 | |
| INPT | MOVIND1 | AC | | 0B2 | Move MSC of IND 1 to accumulator |
| | BAT | '0 | 1 | OB3 | Branch for programming if required |
| | PRGK | | | OB4 | |
| INT1 | MOVSC1 | AC | | OB5 | Move keyboard data to accum. |
| | BAC | 2 | 9 | OB6 | Branch to enter routine if KB was 00101001 |
| | ENT | | | OB7 | |
| | BAC | 2 | 6 | OB8 | Branch to subtotal routine if KB data was 00100110 |
| | SUBT | | | OB9 | |
| | ⋮ | | | ⋮ | |
| JR01 | LAN | 0 | F | OCA | Mask ASCII character |
| | MOVAC | HOLD | | OCB | Put masked data in HOLE register |
| | LAC | 0 | 1 | OCC | Put 00000001 in accumulator |
| | ADD AC | CNT1 | | OCD | increase character count by 1 |
| | CIB | 0 | 2 | OCE | Clear Indicator bit 2 |
| | BSR | | | OCF | DISPLAY character entered |
| | DISH | | | ODO | |
| | BAT | 0 | 0 | OD1 | Branch to ERCL to receive more data from keyboard (location 046) |
| | ERCL | | | OD2 | |
| ENT | SFU CORE | READ | | OD3 | Read core character 01 |
| | MOVCNT1 | SC1 | | OD4 | Move character counter to SC1 and accumulator |
| | BAC | 0 | 0 | OD5 | If character count is zero, branch to ENT2 |
| | ENT2 | | | OD6 | |
| | BIT | 0 | 2 | OD7 | If indicator bit 2 is "1", branch to ENT3 |
| | ENT3 | | | OD8 | |
| ENT4 | CIB | E | 3 | OD9 | Clear all but indicator bits 4 and 6 |
| | MOVIB | AC | | ODA | Put core character 01 in accum. |
| | LAN | 0 | F | ODB | Mask upper four bits |
| | sUB SC1 | AC | | ODC | Subtract character count from maximum field allowed |
| | BAT | 8 | 0 | OAD | Check for excess over maximum characters allowed |
| | ERR | | | ODE | |
| | MOVIB | AC | | ODF | Put core char. o1 in accum. |
| | BAT | 2 | 0 | OEO | Check bit 6 of core char. 01 for CDV of Qual. Number |
| | CDVW | | | OE1 | |
| ENT1 | SFU CORE | ADDR | | OE2 | Get present core location |
| | MOVIB | AC | | OE3 | Put present core address in accumulator |
| | BAC | 0 | 1 | OE4 | Branch if on Qualification Transaction Control Word |
| | QUAL | | | OE5 | |
| QUAL | MOVCNT1 | AC | | 180 | Put character count in accomulator |
| | BAC | 0 | 0 | 181 | If character count is zero, branch to assume it is "1" |
| | QUO1 | | | 182 | |
| QUC1 | SFT | HOLD | 12 | 183 | Shift hold register 12 characters |
| | MOVHOLD | DC1 | | 184 | Put MSD of 2 digit Qualification number in accumulator |
| | BAT | 0 | 8 | 185 | Check for allowable MSD of 2 digit Qualification Number |
| | ERR | | | 186 | |
| | BAT | 0 | C | 187 | Check for allowable MSD of 2 digit Qualification Number |
| | ERR | | | 188 | |
| | BAT | 0 | 5 | 189 | Check for allowable MSD of 2 digit Qualification Number |
| | ERR | | | 18A | |
| | MOVHOLD | DC1 | | 18B | Put LSD of 2 digit Qualification Number in accumulator |
| | BAT | 0 | 8 | 18C | Check for allowable LSD in Qualification Number |
| | ERR | | | 18D | |
| | BSR | | | 18E | Pack Qualification Number in SC1 register |
| | PAC2 | | | 18F | |
| | MOVSC1 | HC2 | | 190 | Put packed Qual. No. in HC2 |
| | LAC | 0 | '4 | 191 | Put 00000100 in accumulator |
| | BSR | | | 192 | Write packed Qualification Numbr in core location D4 |
| | WRT1 | | | 193 | |
| | LAC | 4 | F | 194 | Put 01001111 in accumulator |
| QUA1 | SUF CORE | RECA | | 195 | Send "Accept Address Character" Function Signal to core |
| | MOVAC | OB | | 196 | Put core at location 4F |
| | MOVSC1 | AC | | 197 | Put Qualification code to accumulator |
| | LAN | 0 | F | 198 | Get LSD of Qualification Control Number |
| | MOVAC | CNT1 | | 199 | Put LSD of Qual. No. in CNT1 |
| | SFU CORE | AVRD | | 19A | Read core word 50 |
| | MOVSC1 | AC | | 19B | Put packed Qual. No. in accum. |
| | LAN | F | 0 | 19C | Get MSD of Qualification Number |
| | BAC | 0 | 0 | 19D | If MSD of Qual. No. zero, branch; otherwise continue |
| | QUA2 | | | 19E | |
| | LAC | 1 | 0 | 19F | Put 00010000 in accumulator |
| | SUB AC | SC1 | | 1AO | Subtract binary 1 from Qualification Number |
| | BUCQUA1 | | | 1A1 | Go back 12 locations |
| QUA2 | LAC | 0 | 1 | 1A2 | Put 00000001 in accumulator |
| | SFU CORE | RECA | | 1A3 | Send function "Accept Address Character" to core |
| | MOVAC | OB | | 1A4 | Put core at Loc. 01 |
| | MOVIB | SC1 | | 1A5 | Put core word 50 in SC1 |
| | MOVCNT1 | AC | | 1AG | Put LSD of Qual. No. in accum. |
| MSAC | BAC | 0 | 0 | 1A7 | If LSD of Qualification Number is zero, branch to TVAL |
| | TVAL | | | 1A8 | |
| | MOVSC1 | AC | | 1A9 | Put core. loc. 50 in accum. |
| | ADD AC | 'SC1 | | 1AA | Add Qualification Number to loc. 50 word |
| | LAC | F | F | 1AB | Put 11111111 in accumulator |
| | ADD AC | CNT1 | | 1AC | Subtract 1 from character count |
| | BUC MSAC | | | 1AD | Go back 6 locations |
| TVAL | MOVSC1 | AC | | 1AE | Put LSD of Qual. No. in accum. |
| | BAT | 8 | 0 | 1AF | If Qualification Number is 8 or 9, then error occurs |

| | | | | | |
|---|---|---|---|---|---|
| | ERR | | | | |
| | SFU | TIC | RLA1 | 1B1 | Turn off Qualification Panel |
| | SFU | DISP | DCLR | 1B2 | Cler display |
| | BRR | | | 1B3 | Get stored Qualification |
| | GGUL | | | 1B4 | Number from core |
| | BAT | 4 | 0 | 1B5 | Check to see if clerk or |
| | QU73 | | | 1B6 | cashier opening |
| | BSR | | | 1B7 | Get core flag 3 |
| | CFL3 | | | 1B8 | |
| | BAT | 8 | 0 | 1B9 | Check for special transactions |
| | QU10 | | | 1BA | |
| | BUC | QUA5 | | 1BB | Advance 2 locations |
| QUA4 | BSR | | | 1BC | If cashier opening, indicate |
| | WRF3 | | | 1BD | by writing in coreflag 3 |
| QUA5 | LAC | 0 | 3 | 1BE | Put 00000111 in accumulator |
| | BAT | 0 | 0 | 1BF | Branch to PWR2 location |
| | PWR2 | | | 1CO | |
| PWR2 | SFU | CORE | RECA | 02F | Send "Accept Address Character" function to core |
| | MOVAC | | OB | 030 | Return to core location 03 |
| STAR | | | | 031 | Repeat from start for identification number entry |

What is claimed is:

1. A point of transaction terminal for processing transaction information relating to a commercial transaction comprising:

memory means including read-only memory means for providing an affectable sequence of instruction signals and further including read/write memory means for prðviding a sequence of transaction control signals, any desired transaction control signals being provided in response to said instruction signals;

logic means responsive to said instruction signals and said transaction control signals for providing a plurality of first-type signals in a predetermined order, each of said first-type signals being unique to one portion of said transaction information; and data input means for providing data signals relating to said transaction information, said data signals being provided in an order determined by said first-type signals;

said logic means further being responsive to said desired transaction control signal to provide a signal to said read-only memory to effect the sequence of said instruction signals provided thereby, said logic means further being responsive to said data signals and said affected instruction signals to process said data signals and to provide a terminal output signal representing said commercial transaction.

2. The invention according to claim 1 wherein said first-type signals are provided to a visual display means, which responds thereto, to provide a visual signal indicating the type of transaction information data signals to then be provided by said data input means.

3. The invention according to claim 2 wherein said data input means is a keyboard which provides said data signals in response to a manual operation thereof.

4. The invention according to claim 3 wherein said keyboard includes numeric and function keys and said logic means responds to data signals generated by operating said numeric keys in a first manner and to data signals generated by operating said function keys in a second manner, said first manner being to store the numeric data represented by said data signals for future processing and said second manner being to process data associated with said logic means in accordance with the function represented by said data signal generated by operating said function keys.

5. The invention according to claim 1 wherein said data input means is an automatic tag reader which provides said data signals by reading a coded tag associated with said commercial transaction, said tag reader storing the information conveyed by the code of said tag, said stored information being provided, a portion at a time, to said logic means as said data signals in response to each of said first-type signals.

6. The invention according to claim 5:

wherein the information stored by said automatic tag reader includes predetermined portions of data occurring in a predetermined order; and wherein said logic means applies said first-type signals to said tag reader to cause said stored data to be applied as said data signals, one portion at a time, in said predetermined order.

7. The invention according to claim 1 wherein said logic means is further responsive to said data signals for affecting the particular sequence of said instruction signals.

8. The invention according to claim 7 wherein said read-only memory means provides each of said instruction signals in response to one of a series of certain control signals applied thereto from said logic means, and said read/write memory means provides said transaction control signals in response to certain other control signals applied thereto from said logic means.

9. The invention according to claim 8:

wherein said logic means provides each one said certain control signals to said read-only memory means in response to the application to said logic means of previously provided instruction signals, previously provided transaction control signals, and previously provided data signals; and wherein said logic means provides said certain other control signals to said read/write memory means in response to the application to said logic means of previously provided instruction signals, previously provided transaction control signals, and previously provided data signals.

10. The invention according to claim 9 wherein said read-only memory means includes a read-only memory and read-only memory logic means, said read-only memory storing information in a plurality of different locations thereof, said read-only memory logic means including counting means which can be caused to assume any value within its counting limits in response to the application thereto of one of said certain control signal or which will assume the next incremental value in response to the nonapplication thereto of said certain control signal, said read-only memory logic means providing a signal to said read-only memory indicative of the then existing count in said counting means to cause the information stored in the read-only memory location associated with that then existing count to be provided as said instruction signal.

11. The invention according to claim 8 wherein said read/write memory means includes a read/write memory for storing a plurality of transaction control words each of which is composed of at least one transaction control character, each of said transaction control characters being composed of a plurality of character segments that include at least one bit, at least some of said character segments contain coded information which is determinative of the order in which said data signals are to be provided to or processed by said logic means.

12. The invention according to claim 11 wherein a single transaction control character can be applied to said logic means at a given time as said transaction control signal, said logic means, in response to said instruction signals, decoding selected character segments of the applied transaction control signal to determine the proper first-type signal to be provided or the type of processing to be done by said logic means on previously applied data signals.

13. The invention according to claim 8 wherein said read/write memory means includes a read/write memory having a plurality of locations into each of which information can be written, said information being written into said read/write memory in response to signals from said logic means which includes information signals indicative of said information to be written and function signals commanding said read/write memory means to cause said information to be written in a predetermined location, said information signals being provided by said logic means in response to at least one of said instruction signals, said data signals, or said transaction control signals, and said function signals being provided in response to said instruction signals.

14. The invention according to claim 13 wherein information is stored in each read/write memory location after initially being written therein, the stored information in any selected location being capable of being read from said selected location on command of the application to said read/write memory means of a read signal from said logic means, said read signal being provided by said logic means in response to at least one of said instruction signals, said transaction control signals, or said data signals.

15. The invention according to claim 1 wherein said terminal further includes error indicating means responsive to an error signal provided by said logic means, said error signal indicating that an error exists in the data being provided by said data input means, said error signal being provided in response to logical operations being performed on said data signals by said logic means in response to said affected sequence of instruction signals.

16. The invention according to claim 15 wherein said error signal inhibits further processing of said data signals by said logic means until the error condition manifested thereby has been corrected.

17. The invention according to claim 15 wherein said transaction control signals can be changed so that said error signal is provided in response to different logical operations being performed on said data signals by said logic means in response to a different sequence of instruction signals, said logic means responding to said different sequence of instruction signals by performing said different logical operations in accordance with said changed transaction control signal.

18. The invention according to claim 1 wherein said terminal further includes printing means for printing certain information relating to said commercial transaction, said printed information including information derived from said data input means and information derived from said memory means, said printing occurring on a journal, and at least one of either a slip or a receipt.

19. The invention according to claim 18 wherein the format of the printing is controlled by signals provided by said logic means in response to said instruction signals and selected transaction control signal, said format of the printing being changeable by changing said selected transaction control signal.

20. The invention according to claim 18 wherein said terminal further includes a cash drawer, and a coin dispenser each of which operates in response to signals applied thereto from said logic means.

21. The invention according to claim 20 wherein said terminal further includes at least one switchings means which is operable to control the type of transaction which said terminal is to process.

22. The invention according to claim 21 wherein said types of transactions which said terminal can process include opening the terminal, closing the terminal, and programming the terminal.

23. The invention according to claim 1 wherein said terminal output signal is applied to a central unit.

24. The invention according to claim 23 wherein a plurality of similar terminal output signals are applied to said central unit.

25. The invention according to claim 23 wherein said terminal normally applies its signals to said central unit in a real-time, on-line manner and, wherever said terminal does not apply its output signal to said central unit in a real-time, on-line manner, an indication is made of the nonapplied information and said nonapplied information may be later transmitted to said central unit by a re-entry type of transaction.

26. A point of transaction terminal for processing data relating to a commercial transaction comprising:

instruction signal providing means for providing a series of instruction signals;

read/write memory means including a read/write memory for storing coded information in each of a plurality of selected locations and means for providing a signal indicative of the information in a given one of said selected locations;

data input means for providing a coded data signal indicative of certain input data;

logic means for processing said data signal in accordance with said series of instruction signals, said series of instruction signals being determined by said read/write memory signals;

dat input means for providing a coded data signal indicative of certai input data; 2p1 logic means for procsssing said data signal in accordance with said series of instruction signals, aid series of instruction signals beingddetermined by said read/write memory sigaals;

means for selectively providing a programming signal;

said logic means responding to said programming signal and a data signal applied in conjunction therewith to cause the coded information stored in a given one of said selected read/write memory locations to be replaced by different coded information, said data signal conveying information indicative of said given location and said different coded information, said instruction signal providing means thereafter providing a different series of instructions for processing said data.

27. The invention according to claim 26:

wherein certain ones of said predetermined locations of said read/write memory have stored therein information relating to constant values which are used in processing said data, said constants occasionally requiring change to properly process said data; and wherein other ones of said predetermined locations of said read/write memory have stored therein information relating to the manner in which said data is processed, said manner occasionally requiring change.

28. A point of entry commercial transaction terminal for processing, in a predetermined manner, various types of transaction data relating to a commercial transaction, said terminal comprising:

a control unit which includes logic means, read-only memory means, and a plurality of ports, said read-only memory means providing a controllable sequence of different types of instruction signals to said logic means, said sequence being under the control of a control signal applied to said read-only memory means from said logic means, said logic means responding to (1) a first type of said instruction signals by operating on certain information associated therewith, (2) a second type of said instruction signals by causing an output signal to be applied to a selected port, (3) a third type of said instruction signal by causing an input signal applied to a selected port thereof to become associated therewith, and (4) a fourth type of said instruction signals by causing said control signal to be applied to said read-only memory means to affect the sequence of said instruction signals provided thereby;

data request means coupled to a first port and responsive to a port output signal applied to said first port for issuing signals indicative of the type of said transaction data being requested;

information input means coupled to a second port for providing an information input signal to said second port, a portion of said information input signal manifesting the data requested by said data request means, and another portion of said information input signal manifesting function information; and transaction control means coupled to a third port for providing a transaction control signal to said third port in response to an output signal applied to said third port;

said logic means causing said data information portion of said information input signal to become associated therewith, said logic means processing said data information associated therewith by responding to said first type of instruction signals and by providing said control signals to control the sequence of said instruction signals in a manner determined by the transaction control signal and the function information portion of said information input signal.

29. The invention according to claim 28:

wherein said first means is a display means capable of displaying at least one visual message indicating the type of data then being requested, said message being displayed in response to the signals applied thereto from said logic means; and wherein said signals applied to said display means which cause a message to be displayed are provided by said logic means responding to said transaction control input signals in accordance with said instruction signals.

30. The invention according to claim 29:

wherein said information input means is a manually operated keyboard which has numeric and function keys each capable of being depressed one at a time, said data information portion of said information input signal resulting from a depression of at least one of said numeric keys, and said function information portion of said information input signal resulting from a depression of at least one of said function keys;

wherein said logic means causes said data information portion of said information input signal to become associated therewith and to be displayed on said display means in accordance with said instruction signals; and wherein said logic means processes said data information portion of said information input signal by causing at least one control signal to be applied to said read-only memory means to affect the sequence of said instruction signals, said sequence being affected in a manner determined by said function information portion of said information input signal and said transaction control signals, said logic means processing said data information portion of said information input signal in accordance with said sequence of instruction signals provided by said read-only memory means.

31. The invention according to claim 30 wherein said data input means further includes a tag reader means for providing another portion of said information input signal, said tag reader means being connected to a fourth port and said information input signal consisting of the signal applied to said second and fourth ports, said tag reader means portion of said information input signal being provided in response to reading coded information from a tag associated with the transaction, said tag reader portion of said information input signal including at least one data character followed by a separator character, and representing at least one type of said transaction data, said tag reader portion of said information input signal being stored by said tag reader means and being applied to said fourth port one character at a time in response to output signals applied to said fourth port by said logic means, said data applied by said tag reader being processed by said logic means after said separator character has been applied to said fourth port.

32. The invention according to claim 31 wherein said transaction control means includes a read/write memory having a plurality of storage locations, each of said storage locations being capable of storing a coded transaction control character which is composed of a given number of bits, selected ones of said transaction control characters being grouped into a plurality of transaction control words each of which controls a different portion of the transaction in a manner determined by the particular code of the characters of the word, said transaction processing being controlled by said logic means responding to instruction signals to cause a signal manifesting a selected character to be applied to said logic means as said transaction control signal and thereafter by said logic means responding to the code of said transaction control signal to cause at least one of (1) a message to be displayed on said display means requesting certain data, or (2) performing certain tests on data applied to determine whether any errors exist.

33. The invention according to claim 32 wherein said logic means performs said tests on said data by responding to the code manifested by said transaction control signal to cause control signals to be applied to said read-only memory means for certain codes manifested by a portion of said transaction control signal and by causing other codes manifested by another portion of said transaction control signal to become associated with said logic means and thereafter by operating on said information input signal in accordance with said associated portion of transaction control signal.

34. The invention according to claim 33 wherein said transaction processing can be altered by changing the code of said transaction control characters.

35. The invention according to claim 34 wherein said terminal further includes error indicating means responsive to an error signal provided by said logic means for indicating that an error exists in the data being provided by said data input means, said error signal inhibiting the further processing of the data input signal then being applied to said logic means until said error is corrected, said error signal being provided by the response of said logic means to said tests performed on said information input signal in accordance with the code of a previously applied transaction control signal.

36. The invention according to claim 35:

wherein said terminal further includes printing means connected to a fifth port for printing information relating to said commercial transaction in response to signals from said logic means;

wherein said terminal further includes a cash drawer means which operates in response to signals applied to a sixth port from said logic means;

wherein said terminal further includes a coin dispenser means which operates in response to signals applied to a seventh port from said logic means; and wherein said terminal further includes at least one keylock means which provides information to said logic means to affect the type of transaction to be performed.

37. The invention according to claim 36:

wherein each of the means which receives signals from or applies signals to a port continually sends a coded status signal to that port which manifests the status condition of that means; and wherein a fifth type of the instruction signals to which said logic means responds causes the code manifested by the status signal applied to a selected port to be compared with a stated status code.

38. A point of entry commercial transaction terminal system comprising a central unit responsive to a plurality of terminal output signals for processing said signals in a predetermined manner and a plurality of terminals each of which processes various types of transaction data relating to a commercial transaction, each of said terminals including:

a control unit which includes logic means, read-only memory means, and a plurality of ports, said read-only memory means providing a controllable sequence of different types of instruction signals to said logic means, said sequence being under the control of a control signal applied to said read-only memory means from said logic means, said logic means responding to (1) a first type of said instruction signals by operating on certain information associated therewith, (2) a second type of said instruction signals by causing an output signal to be applied to a selected port, (3) a third type of said instruction signals by causing an input signal applied to a selected port thereof to become associated therewith, and (4) a fourth type of said instruction signals by causing said control signal to be applied to said read-only memory means to affect the sequence of said instruction signals provided thereby;

data request means coupled to a first port and responsive to a port output signal applied to said first port for issuing signals indicative of the type of said transaction data being requested;

information input means coupled to a second port for providing an information input signal to said second port, a portion of said information input signal manifesting the data requested by said data request means, and another portion of said information input signal manifesting function information; and transaction control means coupled to a third port for providing a transaction control signal to said third port in response to an output signal applied to said third port;

said logic means causing said data information portion of said information input signal to become associated therewith, said logic means processing said data information associated therewith by responding to said first type of instruction signals and by providing said control signals to control the sequence of said instruction signals in a manner determined by the transaction control signal and the function information portion of said information input signal;

said logic means providing a signal indicative of said processed data information to a fourth port, said signal becoming said terminal output signal of said terminal.

39. The invention according to claim 38:

wherein each of said terminals further includes output means coupled between said fourth port and said central unit for applying, on command, said logic means output signal applied to said fourth port to said central unit; and wherein said central unit includes means for sequentially checking with each output means of said plurality of terminals, one at a time, to determine whether it should command the then checked output means to apply said logic means output signal applied to said fourth port to said central unit.

40. A point of sale retail terminal system for providing a terminal output signal indicative of a retail transaction, said terminal output signal conveying information concerning the type of transaction, type of merchandise, quantity of merchandise, and price of the merchandise involved in the transaction, said system comprising:

data input means for providing called for data signals indicative of the type of transaction, type of merchandise, quantity of merchandise, and price of the merchandise;

command means, responsive to a command control signal, calling for said data input means to provide said data signals in a predetermined order;

control means which includes logic means, read-only memory means, and read/write memory means, said read-only memory means providing a sequence of instruction signals to cause said logic means to operate on signals applied thereto in a predetermined manner, said read/write memory means providing a sequence of data control signals to said logic means, said logic means operating on said data control signals in a manner determined by the particular sequence of instruction signals applied thereto and providing a sequence control signal, said read-only memory means further including logic means, responsive to said sequence control signal for affecting the sequence of said instruction signals provided thereby, said logic means further responding to said data control signals and the affected sequence of instruction signals to provide said command signal to said command means, said called for data signals being applied to said logic means, and said logic means in response to the sequence of instruction signals affected by said data control signals provided thereto, operating on said data signals and providing said terminal output signal.

41. The invention according to claim 40:

wherein said command means is a visual display means capable of displaying a plurality of visual messages, the particular message displayed being determined by the command signal applied thereto, each of said visual messages indicating the particular data to be provided by said data input means; and wherein said data input means includes a keyboard having a plurality of numerical and function keys, said data signals being provided by manually depressing a fixed number, including zero, of said numerical keys followed by one of said function keys, said logic means responding to the portion of the data signal provided as a result of depressing said numerical keys by storing the data manifested by that portion of the data signal and by providing signals to said display means to display the numbers manifested by the numerical keys so depressed, said logic means responding to the portion of said data signal provided as a result of depressing a function key by providing additional sequence control signals to further affect the sequence of said instruction signals and, in response to the further affected sequence of instruction signals, by processing said stored data in accordance with the function key portion of the data signal and the previously applied command signal applied to said display means.

42. The invention according to claim 41:

wherein said logic means includes error-detecting means to determine whether the portion of said data signal provided as a result of depressing the numeral keys meets certain criteria and for inhibiting the processing of said numeric key portion of said data signal in the event said certain criteria are not met.

43. The invention according to claim 42:

wherein said read-only memory means is capable of providing a sequence of said instruction signals which is affected to uniquely process the numerical portion of said data signal for each different type of data provided to said logic means, and wherein said read/write memory means provides a different data control signal for each different type of data to be provided by said data input means.

44. The invention according to claim 43 wherein said read/write memory means is organized to have a plurality of character storage locations each of which may include a multibit coded character, a plurality of said characters being grouped into a control word, there being a control word for each type of data which can be provided by said data input means, said logic means causing one character at a time to be provided thereto as said data control signal in response to certain of said instruction signals provided by said read-only memory means, said logic means determining from said data control signal so applied, said function key portion of said data input signal and others of said instruction signals what subsequent sequence of instruction signals should be provided by said read-only memory means.

45. The invention according to claim 44 wherein said terminal system includes:

a three-station printing means for printing data associated with said transaction on a journal tape and at least one of a receipt and a slip;

a cash drawer means; and a coin dispenser means;

each of said printing means, cash drawer means, and coin dispenser means being under the control of signals provided thereto by said logic means.

46. The invention according to claim 45 wherein said terminal system further includes:

a plurality of other terminals which provide terminal output signals conveying information concerning the type of transaction, type of merchandise, quantity of merchandise, and price of the merchandise involved in other commercial transactions being processed by said other terminals; and a control unit which sequentially communicates with each of said terminals to determine whether the terminal output signal of the terminal then being communicated with is ready to be provided and, if ready, to receive said terminal output signal for central processing.

47. A point of entry transaction terminal for processing transaction information relating to a commercial transaction and for normally communicating on line, in real time, with a central unit by providing, on command, a terminal output signal manifesting said commercial transaction to said central unit, said terminal further being capable of transmitting a signal to said central unit which manifests a transaction which previously occurred and which was not then communicated to said central unit, said terminal comprising:

memory means for providing a sequence of instruction signals and a sequence of transaction control signals;

logic means responsive to said instruction signals and said transaction control signals for providing a plurality of first-type signals in a predetermined order, each of said first-type signals being unique to one portion of said transaction information;

data input means for providing data signals relating to said transaction information, said data signals being provided in an order determined by said first-type signals; and printing means for printing the data manifested by said data signals in response to first signals applied thereto from said logic means, said printing means being capable of denoting the data printed which has not been communicated to said central unit in response to second signals applied thereto from said logic means;

said logic means being responsive to said data signals, said instruction signals and said transaction control signals to process said data signals, and to provide (1) said terminal output signal, (2) said first signal to said printing means, and (3) said second signal to said printing means in the event said terminal output signal is not communicated to said central unit.

48. The invention according to claim 47 wherein said denoted data which has been printed is re-entered into said terminal at a time when said terminal is communicating on line, in real time, with said central unit, said re-entry being controlled by a special sequence of said instruction signals.

49. A digital processing system for processing data in a programmable manner comprising:

a read-only memory for storing a plurality of individual instructions, including branching instructions, each stored instruction being provided in response to a coded address signal unique thereto; said instructions being arranged in instruction groups with a branching instruction being used to connect different groups;

addressing means for providing to said read-only memory means a sequence of said address signals in response to a first set of control signals applied thereto, a first one of said first control signals causing a given address signal to be an incremented version of the previously provided address signal and a second one of said first control signals causing a given address signal to be a nonincremented version of the previously provided address signals;

read/write memory means for storing a plurality of command characters each of which is arranged in a predetermined coded format to signify a desired manner of processing said data, said read/write memory means being capable of having the code of any character change to cause a different manner of processing said data to occur, said read/write memory means providing a command signal manifesting the code of a given one of said command characters in response to a second control signal applied thereto;

logic means responsive to said instructions for providing said second control signal and responsive to predetermined portions of said provided command signal and said branching instructions for determining whether said first or second ones of said first control signals should be provided to said addressing means and for providing said determined one of said first control signals thereto, whereby said desired manner of processing said data occurs.

50. The invention according to claim 49 wherein each one of certain command characters is divided into at least two coded portions, the code of each portion signifying one manner of processing said data; and wherein said logic means includes decoding means responsive to said command signal provided as a result of the provision of said second control signal by said logic means and said instructions for decoding a given portion of said command signal to determine which of said first or second ones of said first control signals is to be provided to said addressing means.

51. The invention according to claim 50 wherein said decoding means includes register means for storing the command character manifested by said provided command signal and register logic means responsive to said branching instructions for providing said second one of said first control signals in the event said given portion of said stored command character is a predetermined code and for providing said first one of said first control signals in the event said given portion of said stored command signal is not said predetermined code.

52. The invention according to claim 49 wherein said system further includes data input means for providing signals to change the code of any given command character stored by said read/write memory, whereby a different manner of processing said data occurs.

* * * * *